(12) United States Patent
Kielland

(10) Patent No.: US 6,237,929 B1
(45) Date of Patent: May 29, 2001

(54) PEDAL MOUNTED BICYCLE STAND

(76) Inventor: Peter Kielland, 310 Selby Avenue, Ottawa, Ontario (CA), K1Z 6R1

( * ) Notice: Subject to any disclaimer, the term of this patent is extended or adjusted under 35 U.S.C. 154(b) by 0 days.

(21) Appl. No.: 09/321,817

(22) Filed: May 28, 1999

(30) Foreign Application Priority Data

May 29, 1998 (CA) .................................................. 2233773

(51) Int. Cl.$^7$ .................................................. B62H 1/08
(52) U.S. Cl. ........................... 280/294; 280/304; 74/560; 74/562; 74/562.5
(58) Field of Search .................................. 280/294, 304; 74/560, 562, 562.5

(56) References Cited

U.S. PATENT DOCUMENTS

| | | | |
|---|---|---|---|
| 583,573 | * | 6/1897 | Harris et al. ........................ 280/294 |
| 617,028 | * | 1/1899 | Koehler ................................ 280/294 |
| 618,796 | * | 2/1899 | Sennstrom .......................... 280/294 |
| 633,036 | * | 9/1899 | Perkes ................................. 280/294 |
| 1,364,407 | * | 1/1921 | Palmer et al. ...................... 280/294 |
| 3,877,726 | * | 4/1975 | Foster ................................. 280/294 |
| 4,026,574 | * | 5/1977 | Bonora et al. ...................... 280/295 |
| 4,030,774 | * | 6/1977 | Foster ................................. 280/261 |
| 4,171,824 | * | 10/1979 | Foster ................................. 280/294 |
| 4,445,705 | * | 5/1984 | Hayashi et al. ..................... 280/302 |
| 4,563,017 | * | 1/1986 | Kimball .............................. 280/294 |
| 4,971,347 | * | 11/1990 | Cline .................................. 280/301 |

* cited by examiner

*Primary Examiner*—Brian L. Johnson
*Assistant Examiner*—Deanna Draper

(57) ABSTRACT

A bicycle stand, which includes a prop that may be attached to a bicycle pedal. Attachment of the prop to the pedal may be by a "socket-bolt" having a hole in one end and a threaded hole in the other. The socket-bolt replaces the lock nut normally located on the bearing spindle of a pedal. In one embodiment, the socket and prop may include socket and prop having the same polygonal cross section thereby preventing rotational instability of the inserted prop-member. The prop-member may be substantially "L" shaped, thereby providing a ground contact point located below and outboard of the pedal. When the pedal assembly is rotated near its lowest point, the bicycle can be securely tilted onto the prop-member. The prop-member may also be configured to serve as a lever that applies torque to standard mechanic's toolbits.

7 Claims, 19 Drawing Sheets

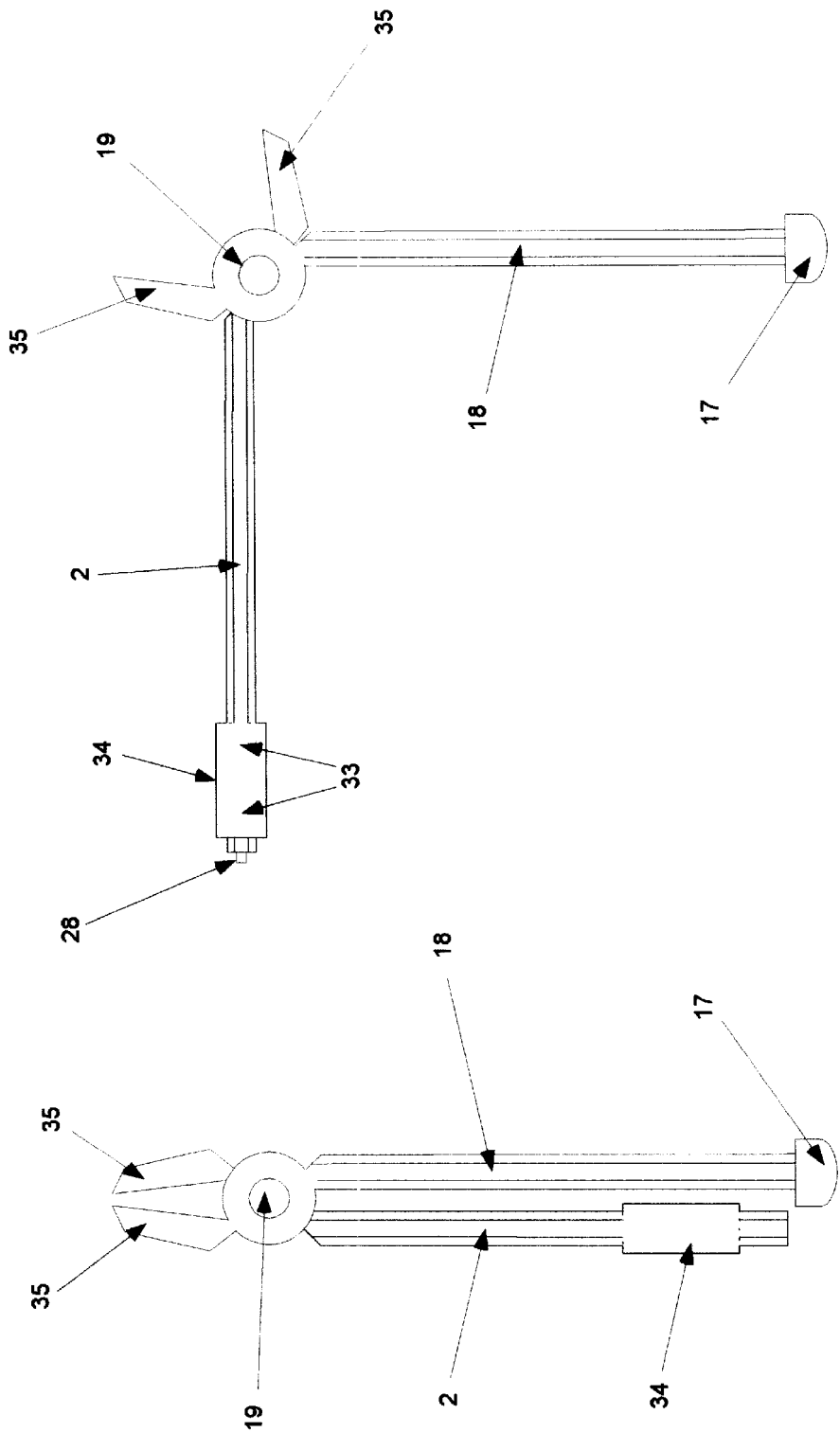

PEDAL MOUNTED BICYCLE STAND

FIELD OF THE INVENTION

This invention relates to bicycles stands.

BACKGROUND OF THE INVENTION

Heretofore, various efforts have been made to devise components, integral to a bicycle's structure, which serve to support the vehicle in a substantially upright position during periods of disuse. These past bicycle support systems fall into two main categories. The first category describes the popular style of stand that attaches to a bicycle's frame. Frame mounted stands generally consist of a pivoting prop-member that can be positioned by the operator to engage the ground, thereby forming a triangular support structure for the bicycle.

The prior art also describes a second, less prevalent category of bicycle stand in which the stand attaches to the rotateable portion or tread of either of the bicycle's pedals. In its correct position, this type of stand effectively extends the pedal's tread to contact the ground, thereby enabling the crank-arm and pedal to support the bicycle. To correctly position a pedal mounted stand, the bicycle's crank assembly is rotated such that the pedal is just slightly aft of its lowest point. Gravitational force will generally cause the pedal and its attached stand to rotate and hang from the pedal's bearing spindle such that the stand is close to the ground. Once the components are thus positioned, the bicycle's pedal, crank arm, chain wheel and power transmission assemblies all become integral parts of the stand. The user can then lean the bicycle onto the pedal-extension/crank-arm assembly and it will act as a bicycle stand by forming a rigid prop between the bicycle and the ground.

By temporarily incorporating the bicycle's existing power transmission components into the stand's support structure, a pedal-mounted stand is potentially more efficient than a frame mounted stand. The major problem with pedal-mounted stands is that the eccentric location of the stand's ground engagement point generates torque about the bearing spindle when the bicycle's weight is applied to the stand. If left unconstrained, the torque induced by the eccentric stand location would rotate the pedal, thereby destabilizing the stand and allowing the bicycle to fall. The prior art mitigates this inherent instability by providing a minimum of two ground contact points disposed at right angles to the axis of pedal rotation (e.g. U.S. Pat. No. 3,877,726). Multiple ground contact points stabilize the pedal against rotation however they significantly increase the complexity and weight of the stand. Since the weight of any permanently mounted stand adds reciprocating mass to the bicycle's drive train; such stands are detrimental to pedaling efficiency and therefore inappropriate for use on lightweight, high performance bicycles. An alternative to using multiple ground contact points is to use the rider's foot pressure to stabilize the pedal against rotation (e.g. U.S. Pat. No. 4,563,017). This approach also has drawbacks related to its weight and ease of use.

Another drawback of previous pedal-mounted stands is that the location of the ground engagement location is immediately below the pedal and therefore quite close to the bicycle's center of gravity. These stands can therefore provide only weak geometric support with respect to the substantial overall height of the bicycle's structure. This weak support geometry can cause the bicycle to fall over if the stand is engaged during strong winds or when the bicycle is parked on soft or sloping ground.

It is therefore an object of the present invention to provide a pedal mounted bicycle stand that eliminates the aforementioned drawbacks inherent within the prior art.

SUMMARY OF THE INVENTION

In accordance with one embodiment of the invention, there is provided a stand for supporting a bicycle through a pedal, the bicycle stand comprising a prop member and a prop receiving means operatively connected to the pedal, the prop member for selective engagement with the prop receiving means.

In further embodiment the prop receiving means is adapted for selective engagement with the pedal and is preferably attached to the pedal coaxially with respect to the pedal spindle.

In further embodiments, the prop member preferably includes a pedal end portion for mating engagement with the prop receiving means, a foot portion adapted for contact with the ground and/or a support portion between the pedal portion and foot portion. In addition, the prop member may include at least two sections articulated with respect to one another and in a preferred embodiment, the degree of articulation of the at least two sections can be varied with respect to one another and selectively locked at various intermediate positions. In one embodiment, the prop member is a pair of pliers having two arms pivotable with respect to one another wherein at least one arm is adapted for mating engagement with the prop receiving means and the other arm is the foot portion.

In further preferred embodiments at least one end of the prop member is adapted for operative connection to a tool bit and that the prop member includes at least one magnet for magnetically attaching the prop member to the bicycle.

In still yet further embodiments, it is preferred that the bicycle stand includes retention means on the prop member or prop receiving means for securing the prop member to the prop receiving mans, the retention means selected from any one of or a combination of a magnet or a friction retention system.

In still further embodiments, the prop receiving means is adapted for operative attachment to the pedal through the dust cap threads or to the pedal spindle.

In a still further embodiment, the prop receiving means includes a bore having a depth sufficient to receive the prop member and support a bending moment of the prop member with respect to the prop receiving means sufficient to support the bicycle and in another embodiment, a magnet within the bore to retain the prop member within the bore.

In further a further embodiment, the bore is adapted to prevent rotational movement of the prop member with respect to the bore and in another embodiment is adapted to allow rotational movement of the prop member with respect to the bore.

In yet still another embodiment, the prop receiving means is a wrench head adapted for engagement with the flats of the pedal spindle adjacent the crank arm.

In a more specific embodiment, the invention provides a bicycle stand for supporting a bicycle through a pedal, the bicycle stand comprising a prop member and prop receiving means, the prop member for selective engagement with the prop receiving means and the prop receiving means for selective engagement with the pedal, the prop member including a lug end portion for mating engagement with the prop receiving means and a foot portion adapted for contact with the ground, the foot portion eccentric with respect to the lug end portion and wherein the prop receiving means is adapted for operative attachment to the pedal coaxially with the pedal spindle, the prop receiving means having a bore having a depth sufficient to receive the prop member and to support a bending moment of the prop member with respect to the prop receiving means to support the bicycle wherein the bore is further adapted to allow rotational movement of the prop member with respect to the prop receiving means.

In still yet further embodiments the invention provides a pedal comprising a prop receiving means operatively connected to the pedal, the prop receiving means adapted to enable selective engagement of a prop member with the pedal and to support a bending moment of the prop member with respect to the prop receiving means sufficient to support a bicycle, a prop for supporting a bicycle through a bicycle pedal, the prop comprising a prop member adapted for operative and selective connection with a prop receiving means on the bicycle pedal, the prop member further adapted to support a bending moment of the prop member with respect to the prop receiving means sufficient to support the bicycle and a device enabling a bicycle to be supported through a prop member and a bicycle pedal the device comprising a prop receiving means adapted for operative and selective connection to the bicycle pedal, the prop receiving means further adapted to support a bending moment of the prop member with respect to the prop receiving means sufficient to support the bicycle.

BRIEF DESCRIPTION OF THE DRAWINGS

FIG. 22 illustrates a side view of the removable, foldable prop configured to act as a toolkit that includes a pair of pliers.

FIG. 23 illustrates a front view of an alternate embodiment of the removable, foldable prop configured to act as a toolkit that includes a pair of pliers

DETAILED DESCRIPTION

With reference to the drawings, various embodiments of a pedal mounted bicycle stand are described.

Figure 1:
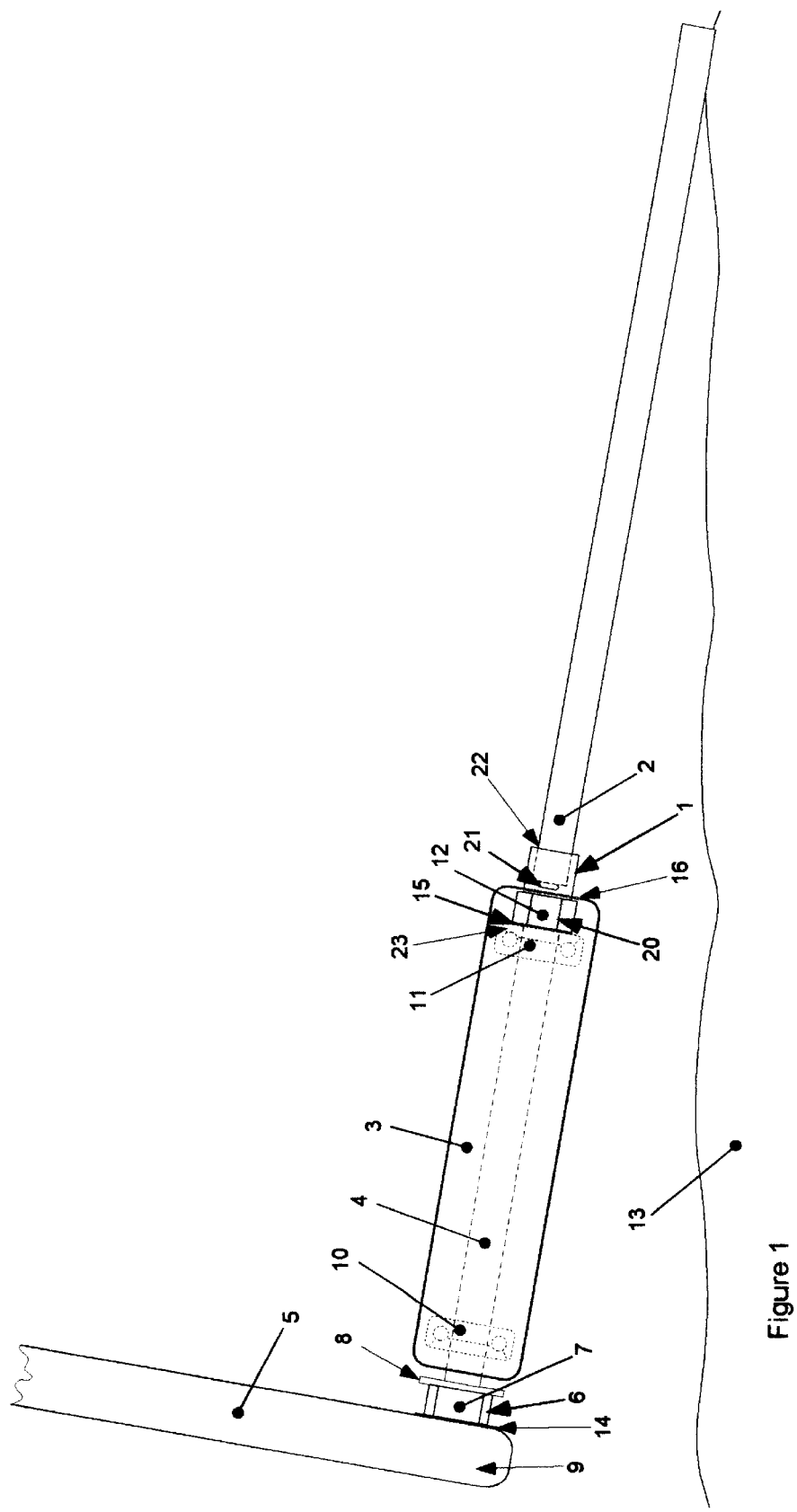
FIG. 1 is an elevational view of a portion of a conventional bicycle having a support stand mounted thereon which is constructed in accordance with and embodying the present invention: said stand being comprised of a prop having a round cross-section, said prop being illustrated in its operative support position with respect to the ground support surface.

In a first embodiment illustrated in FIG. 1, a straight prop 2 is affixed to the outboard end of an existing pedal's non-rotateable bearing spindle 4.

Figure 8:
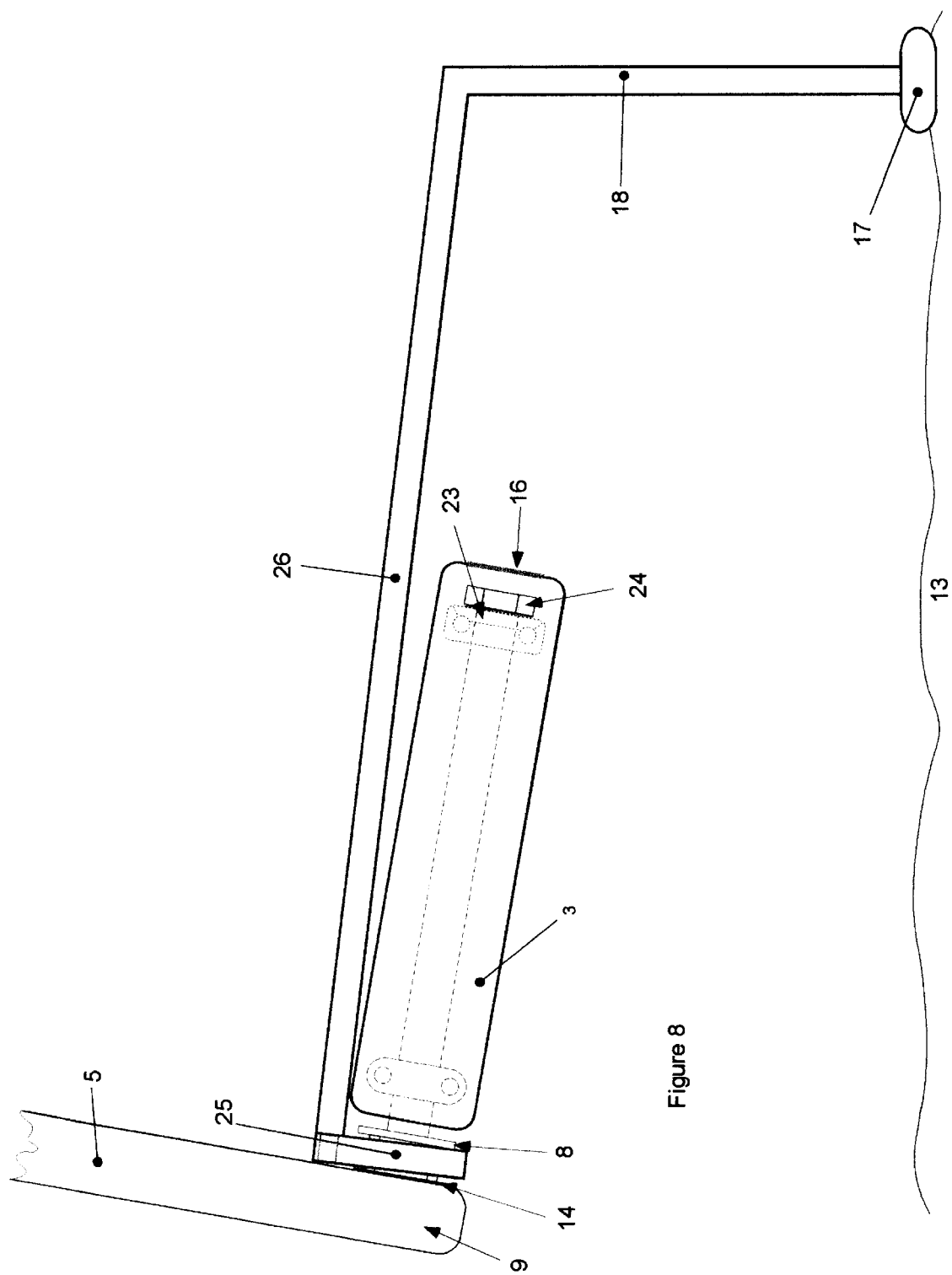
FIG. 8 illustrates the "wrench-headed" prop embodiment of the present invention, affixed to the inboard end of the pedal's bearing spindle.

Preferably, the prop 2 is attached to the spindle with a "socket-bolt" 1 wherein the socket-bolt 1 replaces the standard lock-nut of the pedal (24 in FIG. 8). The lock-nut 24 is threaded on the outboard end of the bearing spindle 4 where it normally serves to lock the position of the threaded "cone-nut" 23 used to adjust the bearing clearance in pedal bearing assemblies 10 and 11. If the pedal employs nonadjustable needle bearing assemblies rather than adjustable ball bearings, then the lock nut 24 generally serves to retain the bearing assembly at its correct location near the end of the bearing spindle. In either case, to mount the socket-bolt 1 onto a typical bicycle pedal assembly, the lock-nut 24 is removed and replaced with the socket-bolt 1.

Figure 3:
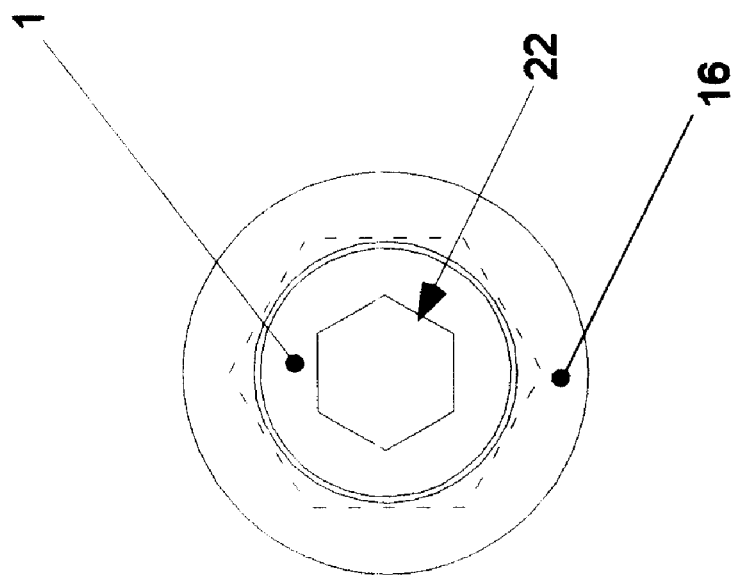
FIG. 3 is a large-scale, front-view illustration of the socket-bolt and dust-cap assembly depicted in FIG. 1 that temporarily affixes the prop to the pedal's bearing spindle.
Figure 2:
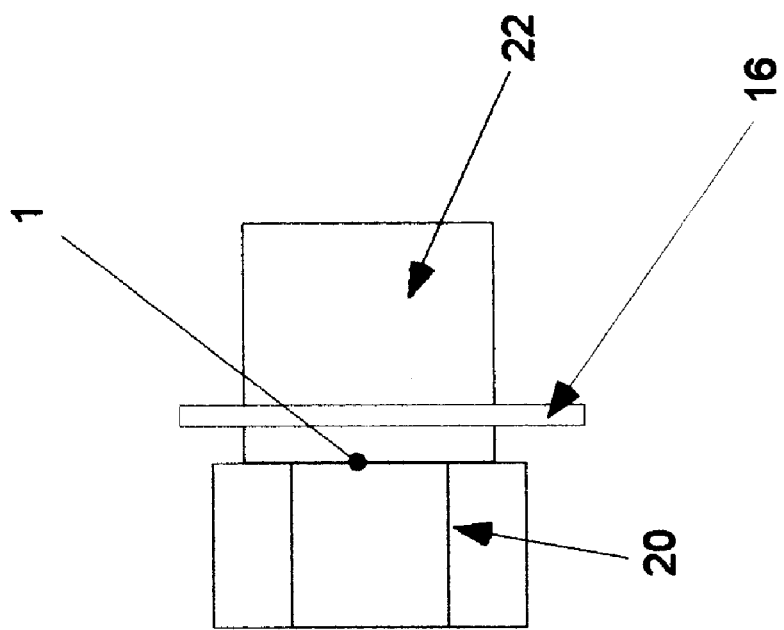
FIG. 2 is a large-scale, side-view illustration of the socket-bolt and dust-cap assembly depicted in FIG. 1, showing a polygonal socket and insertable prop.

The socket-bolt 1 as shown in FIGS. 2 and 3 is substantially longer in its axial dimension than the lock-nut 24 that it replaces, thereby making it long enough to protrude past the end of the bearing spindle 4. The socket-bolt 1 will generally be long enough to protrude past the end of the pedal's tread 3 (as shown in FIG. 1). However, the internal constructed dimensions of some pedals may permit the end of the socket-bolt to mount flush with the end of the pedal's tread 3. Since any added pedal width will reduce the bicycle's cornering clearance, the ideal socket-bolt configuration is to position its socket aperture 22 flush with the outer edge of the tread 3.

The socket-bolt 1 has a threaded bore in its inboard end, coaxial with its generally cylindrical shape. The socket-bolt's threaded hole is identical to the threaded bore of the lock-nut 24 that it replaces, thereby enabling it to replicate its locking function. The inboard end of the socket-bolt may have a hexagonal outer cross-section that is similar to that of the lock-nut it replaces, thereby providing a surface which can be used for tightening the socket-bolt 1 onto the bearing spindle 4. A slot (not illustrated) may also be provided on the outer face of the socket-bolt, thereby permitting a flat screwdriver to be used to tighten it onto the spindle 4.

The outboard end of the socket-bolt 1 has an open socket indentation 22 co-axial with the body of the socket-bolt and therefore co-axial with the bearing spindle 4 onto which it is threaded. The socket 22 is deep enough that a prop 2 inserted within can transmit a bending moment from the prop through the socket-bolt onto the pedal's bearing spindle 4 and crank arm 5. As illustrated in FIGS. 2 and 3, the outer portion of the socket-bolt may have its exterior machined to have a round outer cross-section. The socket indentation may have a hexagonal cross-section as shown in FIG. 2 or a round cross-section as shown in FIG. 1.

Locating the Stand's Ground Contact Point Coincident with the Bearing Spindle's Axis:

In the present invention's most basic embodiment (illustrated in FIG. 1), the socket 22 has a round internal cross-section and therefore cannot transmit any torque from the prop 2 into the bearing spindle 4 and crank arm 5. This embodiment is comprised of a straight, round prop 2 that fits into a cylindrical socket in the socket-bolt 1. The inserted prop is long enough to extend the pedal's bearing spindle 4 to several times its normal length. A bending moment exists within the prop when it supports the bicycle however, since the prop 2 is coaxial with the bearing spindle 4, no torque about the bearing spindle is generated.

A straight prop 2 that's coaxial with the bearing spindle must be long enough that the bicycle doesn't need to be tilted to an extreme angle in order to rotate the prop's tip down into contact with the ground 13. Typically, a straight prop that's two or three times the length of the pedal's bearing spindle will be sufficiently long to retain the tilted bicycle's center of gravity well inside the tip of the prop, thereby insuring the stand's stability. Since, the longer the straight prop is, the more stable the pedal mounted bicycle stand will be, the length of a straight prop is a compromise between having a very long, stable prop and having a shorter prop that's compact enough to be conveniently installed and transported.

To deploy this straight prop embodiment, the bicycle's pedal crank arm 5 is rotated such that the inserted straight prop 2 is just aft of its lowest point. No attention need be given to the orientation of the front wheel. The bicycle can then be tilted such that the outboard end of the prop rotates down to engage the ground 13. Resistive force from the ground levers the prop towards the bicycle, thereby maintaining the bicycle in the desired upright position. The same resistive force prevents the bicycle from advancing as force is applied to the crank arm 5.

If the pedal is not positioned exactly at bottom dead center, some of the bending moment in the prop will be transformed into rotational force in the crank arm assembly. If the pedal is positioned slightly aft of bottom dead center then the resulting rotational force will tend to induce forward motion of the bicycle (through its chainwheel, chain, rear sprocket, sprocket ratchet and rear wheel). Since this forward force is constrained by friction between the prop 2 and the ground 13, the dynamic stasis of horizontal and vertical forces stabilizes the bicycle in the desired upright attitude. If the user turns the front wheel at right angles to the bicycle, this dynamic stasis is enhanced by an "orthogonal wheel blocking effect" thereby imparted to the bicycle and described in detail below.

The straight prop 2 engages the ground's support surface 13 at a low angle of incidence, thereby increasing its ground contact area as downward pressure causes the tip to sink into the ground. This automatic increase in the size of the load-bearing surface renders the straight prop embodiment well suited for use over soft terrain such as loose gravel or sand.

When deploying the stand, the crank mechanism 5 can be rotated to adjustably raise the height of the pedal. The height adjustment's sensitivity increases as the pedal is rotated further away from bottom dead center. This height adjustment means can be used to compensate for sloping ground conditions that require the prop to be positioned somewhat higher on the bicycle. It also enables the user to compensate for the variations in pedal height caused by the different crank-arm lengths and bottom bracket heights encountered on different bicycles.

To reduce costs, a socket-bolt may be installed on only one of the bicycle's two pedals. Preferably, a socket-bolt 1 or other means of providing prop fixation will be installed onto both of the bicycle's pedals. Installing prop fixation means on both pedals provides several benefits:

1) Since the socket-bolt will generally be slightly heavier than the lock-nut 24 that it replaces, installing a socket 22 onto both pedals insures that the crank and chainwheel assembly maintains its dynamic balance.

2) Providing prop fixation onto both the right and left side of the bicycle also facilitates the rider's task of mounting and dismounting the bicycle (since the stand can be quickly installed on whichever side the rider prefers to mount and dismount from).

3) Providing prop fixation onto both the right and left side of the bicycle enables the user to easily change the side of the bicycle on which the prop is installed. This flexibility facilitates maintenance activities carried out on both sides of the bicycle (since the bicycle can be solidly leaned in both directions).

As shown in FIG. 1, a retrofitted socket-bolt 1 will often protrude significantly further than the pedal's original lock nut 24. This will generally preclude re-fitting the pedal's original bearing dust-cap 16 to the pedal after the lock nut 24 has been replaced. To prevent dust and road debris from entering the bearing, a preferred embodiment therefore provides a modified dust-cap 16 to seal the air gap surrounding the socket-bolt.

In its simplest embodiment, the user might be instructed to drill a hole through the pedal's existing dust cap 16 thereby permitting the retrofitted socket-bolt to protrude through it. This simple measure permits the dust cap to rotate around the outer, cylindrical portion of the socket-bolt, thereby shielding the bearing 11 from most road debris.

In a preferred embodiment, a newly manufactured dust cap 16 is provided with the socket-bolt 1 with an accurately machined concentric hole in it, thereby maintaining a tight tolerance on the air-gap surrounding the socket-bolt.

In a preferred embodiment, the hole in the dust-cap 16 through which the socket-bolt 1 protrudes has a tapered edge made of soft, sealing material such as neoprene (not illustrated). This enhanced dust-cap seal minimizes frictional drag caused by slight contact between the rotating dust cap 16 and non-rotating socket-bolt 1. Alternatively, an O-ring may be installed onto the outer surface of the socket-bolt such that it lightly contacts the inside of the rotating dust-cap.

The dust-cap 16 illustrated in FIGS. 2 and 3 has the general form of a flat washer. In an alternate embodiment (not illustrated), the dust-cap's outboard surface is curved to provide a smooth and more decorative transition between the protruding socket-bolt and the side of the tread 3. If the socket-bolt protrudes significantly past the standard tread 3, then the curved outer surface of the dust-cap will make the socket aperture 22 appear to have been manufactured flush with the exterior of the pedal assembly.

Many pedals are manufactured such that the threaded section on the outer end of the bearing spindle and its lock nut are housed within a cylindrical indentation on the outer edge of the tread 3. In these cases, the dust seal may be made directly onto the cylindrical wall of the tread's indentation. Therefore, in an alternate embodiment (not illustrated), the socket-bolt 1 and dust-cap 16 are integrated into a single socket-bolt having a more complex shape. Fusing the dust-cap to the socket-bolt effectively adds a circular flange that extends outward from the socket-bolt to within close proximity of the cylindrical indentation in the side of the tread, thereby preventing most road debris from entering the pedal assembly. An appropriately sized O-ring may be added to the outer rim of this socket-bolt to enhance its seal with the adjacent tread.

The present invention is useful in applications where the bicycle may be moved from one parking spot to another without being ridden. For example: bicycle retailers typically store many bicycles in a display rack and prospective customers may wish to remove a particular bicycle from the rack for closer inspection. Since the present invention can be easily fitted to each bicycle, it provides an alternative to such display racks. As the bicycle is moved about, the prop 2 may inadvertently fall out of the socket 22, thereby rendering the stand ineffective. Therefore, it is preferred that a retaining system is provided to prevent the inserted prop 2 from falling out of the socket 22.

Figure 19:
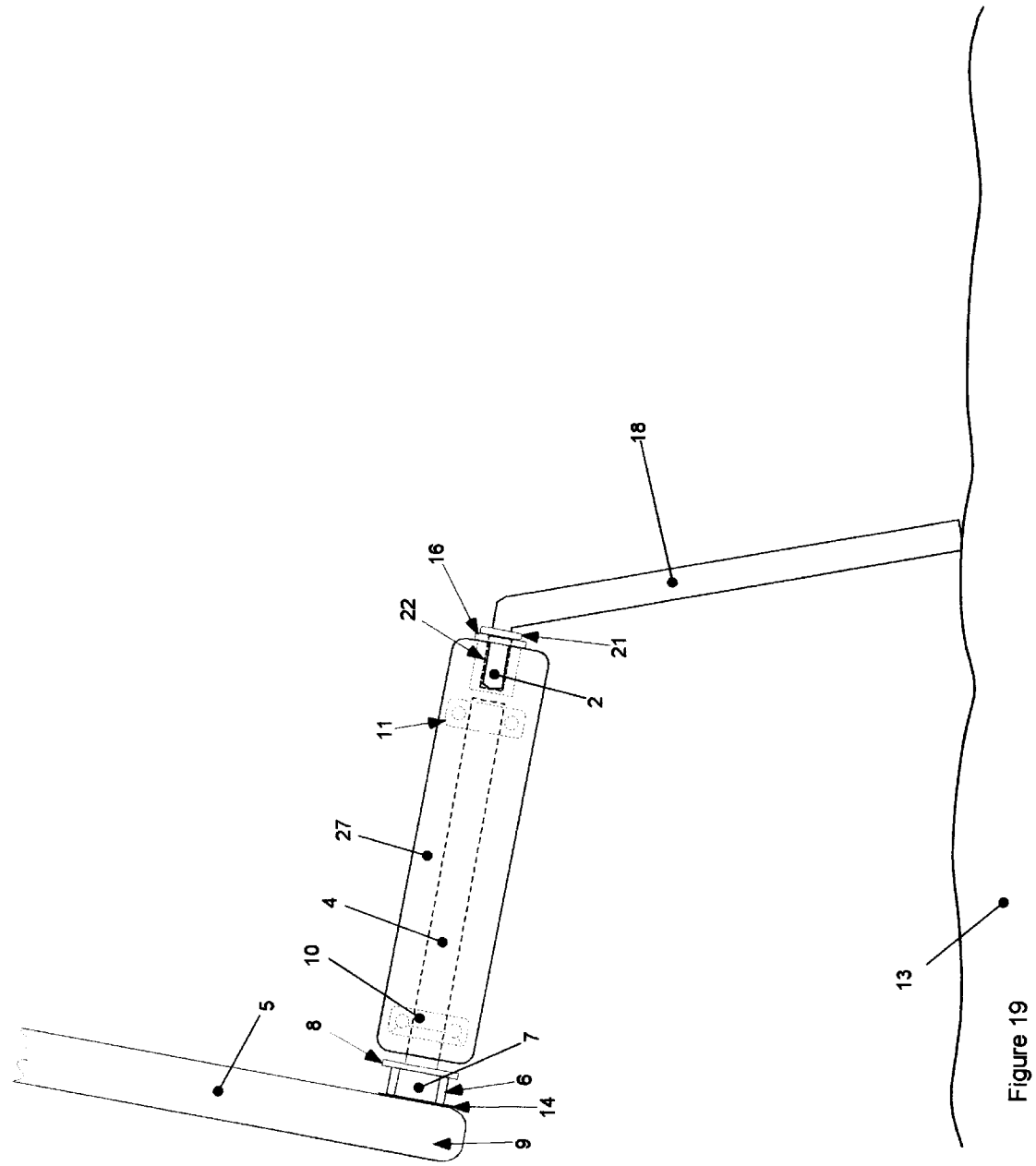
FIG. 19 illustrates a removable prop embodiment used in conjunction with orthogonal wheel blocking in which the socket is formed within a threaded dust-cap.

Three examples of suitable prop retaining system are described below:

1) A magnet or magnets that temporarily retain the prop in its fully seated position within the socket-bolt. A magnet 21 is affixed to either the end of the prop 2 and/or the bottom of the socket 22, thereby providing attractive force that maintains the prop in its desired location within the socket 22. If a single magnet affixed to only one of the two mating parts is employed, then its contacted material must be magnetically attractable. If for example, the magnet is embedded in the end of the inserted prop (not illustrated) then the socket must be formed of magnetically attractable material such as 400 series stainless steel. Alternatively, a ring magnet is affixed around the prop and is attracted to the outer face of the tread-socket. FIG. 19 illustrates a magnetic prop retention means comprised of a magnetic ring 21 affixed to the insertable prop 2. The socket 22 is integral to the threaded dust-cap 16, thereby forming a monolithic tread-socket 27. The dust-cap 16 and integral socket 22 is made of magnetically attractable metal, thereby attracting and retaining the prop. Other prop retention means based on magnetic, fictional or mechanical interference will be readily apparent to those practiced in the art.

2) A spring-loaded ball and indentation system (not illustrated) that is similar to the one commonly used to retain socketed mechanic's tools on their drive shaft. The spring-loaded ball and indentation is used to temporarily retain the prop in its fully seated position within the socket-bolt.

3) A lockable insertion device (not illustrated) which enables the inserted prop to be removed only by the owner of the bicycle and thereby protects the prop from theft. A typical implementation of this embodiment is comprised of a prop that has a spring-loaded hook affixed to the side of its insertable end. When the prop 2 is fully inserted, the spring-loaded hook latches onto an indentation on the inside wall of the socket 22, thereby preventing the prop from being withdrawn. To release the prop, the owner must insert a key into a matching hole in the side of the socket-bolt. The key penetrates the wall of the socket and depresses the spring-loaded hook, thereby releasing it from the indentation in the wall of the socket and permitting the user to withdraw the prop.

Locating the Stand's Ground Contact Point Eccentric to the Bearing Spindle's Axis:

In the basic embodiment illustrated in FIG. 1, the interior of the socket-bolt's socket 22 is round and therefore unable to transmit any torque applied by an inserted prop 2. The round socket therefore cannot contribute restraining force to help stabilize the pedal structure from rotating if the bicycle moves forward.

Figure 4:
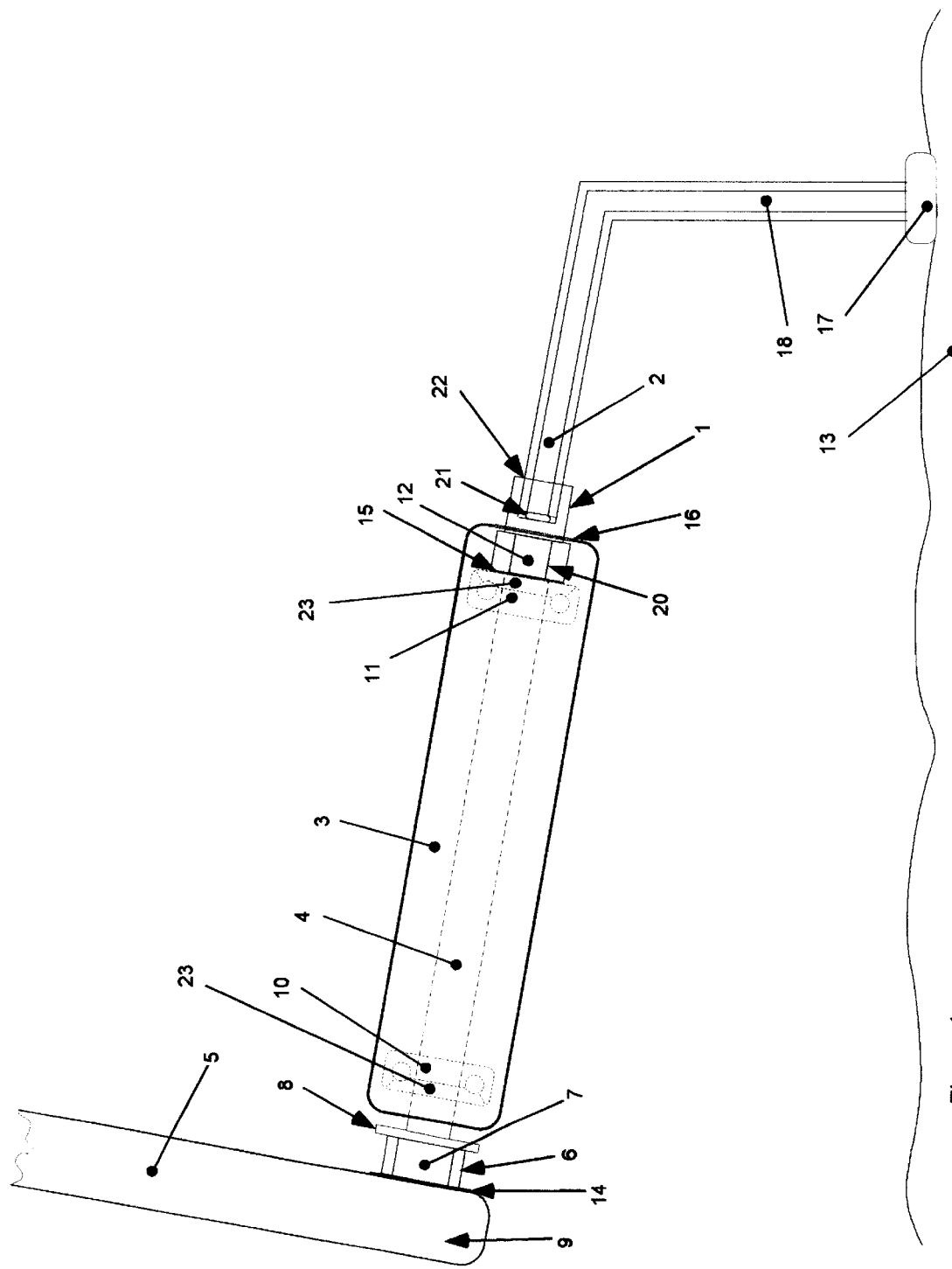
FIG. 4 is an elevational view of a portion of a conventional bicycle having a support stand mounted thereon which is constructed in accordance with and embodying the present invention: said stand being comprised of an "L" shaped prop shown rotationally locked to the bearing spindle in its operative support position with respect to the ground support surface.

FIG. 4 illustrates an embodiment in which the socket's cross section has a polygonal shape that enables the socket-bolt to receive and transmit torque from an inserted prop having the same cross-sectional shape. The substantially "L" shaped prop provides a ground contact point which is eccentric to the axis of the bearing spindle and therefore generates torque when the weight of the bicycle is exerted on the ground contact point. Torque applied to the inserted prop 2 is transmitted through the socket 22 and into the pedal's bearing spindle 4 which in turn is solidly affixed to the crank-arm 5 thereby preventing the inserted prop from swinging upwards and causing the bicycle to fall. This mechanical constraint augments the rotational stability of the stand when used in conjunction with "orthogonal wheel-blocking" (described below). In the absence of orthogonal wheel blocking (i.e. when the front wheel is aligned straight ahead), the stability imparted to the stand by constraining prop rotation is sufficient to provide adequate support for the bicycle.

One advantage of using an eccentric ground contact point (i.e. one that creates an "L" configuration between the bearing spindle 4 and the prop 2) is that, by shortening the prop's overall length, it can be made significantly lighter and more compact than a straight prop. The "L" shaped prop configuration is comprised of a substantially horizontal section 2 that inserts into the socket-bolt 1. The substantially horizontal section 2 is affixed at its outer end to a substantially vertical section 18 that extends down to contact the ground 13. The length of the substantially horizontal section 2 is variable. FIG. 4 illustrates a relatively long insertable prop, thereby improving the stand's lateral stability.

Figure 11:
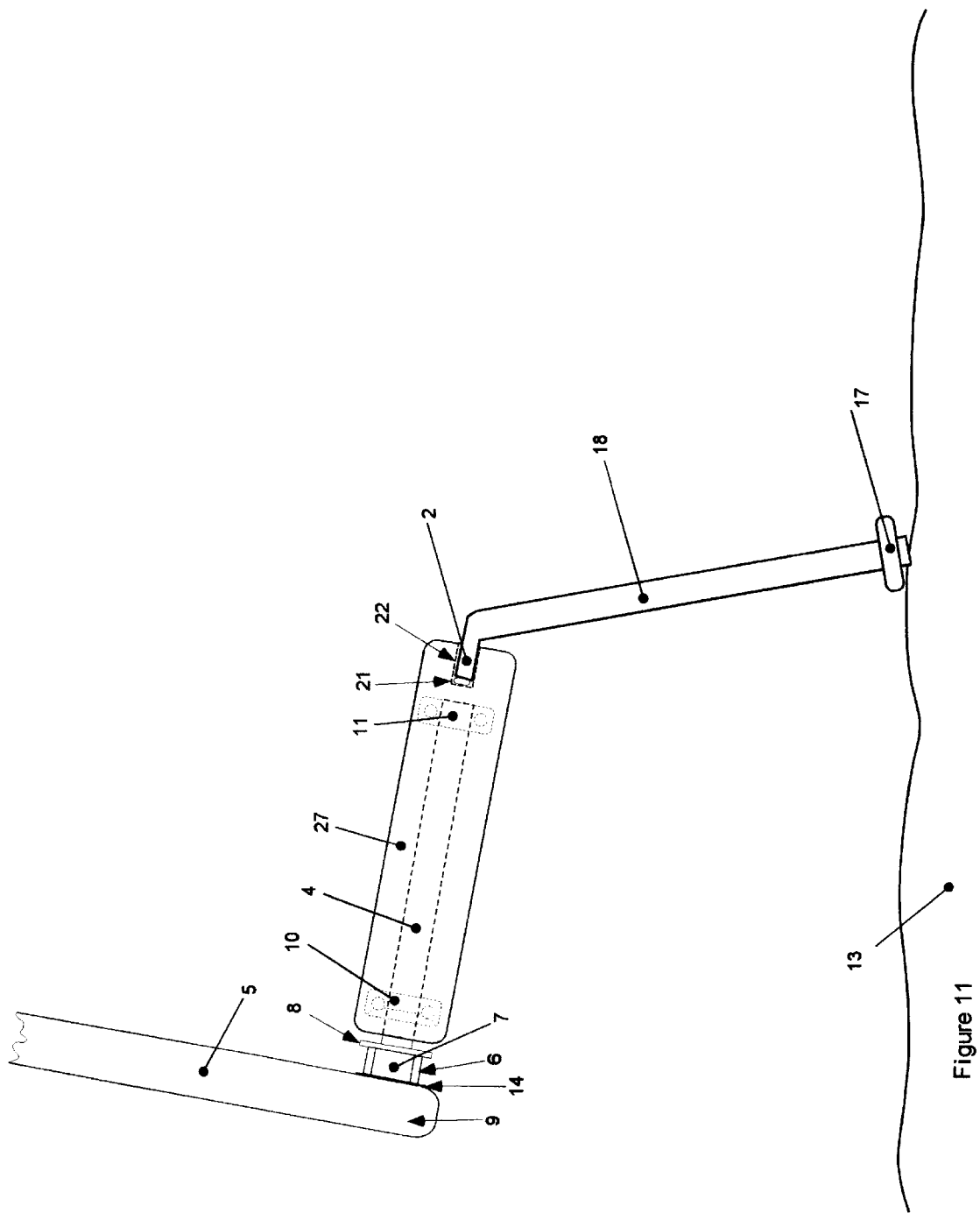
FIG. 11 illustrates an "L" shaped prop embodiment of the present invention, the prop being inserted to a round socket that is fabricated flush to the tread member's outboard edge.

FIGS. 11 and 19 illustrate a relatively short insertable prop 2 that improves the stand's compactness. In FIG. 11, the short prop section 2 is inserted into a round socket 22 formed into the side of the tread 3. In FIG. 19, the short prop 2 is inserted into a round socket 22 formed in the dust-cap 16 and the dust-cap is threaded into the tread 3.

The example illustrated in FIG. 4, shows the substantially vertical portion of the prop 18 manufactured at a fixed angle with respect to the substantially horizontal prop 2 simply by bending a single piece of rod material. Typically, the angle between the two members 2, 18 will be somewhat greater than 90 degrees, thereby compensating for the lean angle of the parked bicycle and also moving the ground contact point further out to provide greater lateral stability.

FIGS. 4a and 4b illustrate an embodiment in which the two sections of the prop are joined by a foldable joint 19. The foldable joint 19 has an internal hinge stop that prevents the substantially vertical section from opening past the angle appropriate for good support geometry. The foldable joint 19 enables the prop assembly to be folded into a more compact form for easier storage.

In other embodiments of a folded prop (not illustrated) the hinge stop in the foldable joint 19 can be adjusted to enable the user to vary the fully opened angle between the two prop sections 2, 18. In addition, the foldable joint 19 may enable the user to positively lock the angle between the two sections. Examples of such systems may be various screw-stop adjustment mechanisms for the hinge-stop angle as well as various spring-loaded "pin and hole" type of hinge stop mechanisms. The adjustable angle provides the user with a means to adjust the geometry of the prop to accommodate various pedal heights and terrain conditions. Increasing the angle wider increases the lean angle of the bicycle and places the ground contact point further away from the bicycle. Decreasing the angle compensates for higher pedals or ground that slopes down from the bicycle.

The substantially vertical prop 18 has a high angle of incidence with the ground and therefore doesn't benefit from the pressure distribution characteristic inherent to the straight prop shown in FIG. 1. The lower end of an "L" shaped prop therefore tends to dig into soft ground which, in an extreme case would cause the bicycle to fall. Therefore, embodiments of the bent prop may optionally include a foot 17 affixed to the lower end of the prop 18 that serves to distribute the pressure onto a larger area of the ground 13. If the stand is intended for use only on hard surfaces such asphalt or concrete, the bottom of the prop 18 may adequately distribute pressure onto the ground 13 without the need to include a foot 17.

The foot 17 may be of any shape that distributes pressure from the lower tip of the prop assembly over a larger area on the ground. In order to facilitate compact storage of the stand, the foot 17 may be detachably or foldably affixed to the prop.

In another embodiment, the substantially vertical section 18 can be adjusted in length to accommodate the variations in pedal height. The simplest method for doing so is to fabricate the two prop sections 2, 18 with different lengths. The user thereby has a choice of two substantially vertical prop lengths that can be selected simply by switching the end of the prop that's inserted into the socket-bolt 1. In another example of the length adjustment means, the foot 17 is affixed to the prop 18 by a threaded bolt protruding from its upper surface. This height adjustment system (not illustrated) threads into the lower end of the prop 18, thereby permitting the user to screw the foot 17 in and out, to adjust the effective length of the prop.

Angular Adjustment of the Prop:

The socket 22 and inserted prop 2 may have a polygonal cross-section that constrains relative rotation. In order to minimize the torsional forces generated by the prop's eccentric ground contact point, the lower section of the "L" shaped prop 18 should be maintained nearly vertical in the fore/aft plane. Due to normal manufacturing tolerances on the threaded portions of a bicycle pedal, the angular orientation of an installed socket-bolt 1 will cause the lower prop 18 to be affixed at a somewhat random angle with respect to the vertical. A user installing the socket-bolt 1 onto a pedal's bearing spindle 4 should therefore be able to adjust the angular orientation of the lower prop 18 with respect to the crank arm 5.

For example: a matching, polygonal, cross-sectional shape of the prop 2 and socket 22 permits the user to selectably insert the prop 2 at one of the N possible angular orientations (where N is the number of outer vertices on the polygonal cross-section). For example, if the cross-section of the socket 22 is square, then the user can selectably rotate the prop in four course increments of 90 degrees. As the cross-sectional shape gains more facets, the angular resolution becomes finer. Ultimately providing finer and finer adjustment increments results in a spline fitting having many closely spaced options for correctly orienting the lower section of the prop 18 with respect to the vertical.

Another embodiment enabling polygonal adjustment (not illustrated) is to manufacture a longitudinal twist into the prop 2 that's equal to one half of the angle subtended by each of the polygon's facets. For example: an "L" shaped prop having a hexagonal cross-section would have a longitudinal twist of one twelfth of a revolution introduced to the hexagonal extrusion. This permits the user to select one of six angular orientations on one end of the prop in an effort to achieve correct vertical orientation of its other end. If however, none of the six orientations on one end of the "L" provides an acceptable vertical orientation, the user may choose to insert the other end of the "L" shaped prop. The one twelfth of a revolution twist in the prop thereby provides six alternate angular orientations.

FIG. 4 illustrates another embodiment of enabling angular adjustment of the alignment through the use of a set of shim washers 14. These adjustment shims are used to fine-tune the depth to which pedal's bearing spindle can be screwed into the crank-arm before the end of it's threaded portion 9 firmly seats against the crank-arm's outer surface 5. If the prop 18 is not satisfactorily oriented, the user adjusts it by removing the pedal and inserting a shim washer 14 over the threaded portion of the bearing spindle 9. When the pedal's bearing spindle 4 is re-attached to the crank-arm 5, the shim 14 prevents the bearing spindle from being threaded as far into the crank arm, thereby altering the angular orientation of the vertical portion of the prop 18. A series of shims 14 of varying thickness' can be provided to permit the bearing spindle's orientation to be adjusted in small increments.

Another shimming method for adjusting the prop's orientation is provided which is specific to those embodiments that employ a socket-bolt 1. In those cases, a series of smaller diameter shim washers of varying thickness 15 may be provided for insertion underneath the socket-bolt 1. Instead of re-orienting the entire bearing spindle/socket-bolt assembly, the smaller shims re-orient only the socket-bolt portion of the stand assembly. The user adjusts the socket bolt's orientation by removing it and inserting a shim washer 15 over the outboard, threaded portion 20 of the bearing spindle 4. When the socketbolt's inner portion 12 is re-attached to the bearing spindle thread 20, the shim 15 prevents it from being threaded as far as before, thereby altering the angular orientation of the vertical portion of the prop 18.

Embodiments in Which the Prop Clamps onto the Inboard End of the Bearing Spindle:

Some bicycle pedals have a sculpted overhang at the outboard end of the pedal's tread 3 that obstructs access to the end of the bearing spindle 4. These pedals are therefore not amenable to retrofitting a socket-bolt 1 that can receive the prop 2.

Therefore, in another embodiment of the invention, the prop clamps onto the inboard end of the bearing spindle 6 rather than its outboard end 20.

In one embodiment illustrated in FIG. 8, the clamping portion of the prop 25 locks onto the pedal's bearing spindle 4 by exploiting the bearing spindle's flat sides 7 that are commonly located on the spindle immediately outboard of its threaded attachment 9 to the crank-arm 5. Normally, the flat sides 7 are machined into the spindle 4 to serve as grippable surfaces for tightening the pedal's threaded attachment 9 into the crank-arm 5. By exploiting the lever arm effect exerted by the prop 2, the present invention applies a jamming torque to the two flat sides 7 at right angles to the bearing spindle's plane of rotation, thereby clamping the prop 2 to the inner portion of the spindle 6.

The prop is comprised of unequal length sections: a short "wrench-headed section" 25 connected at right angles to a long "lever section" 26. The wrench-headed section 25 is substantially vertical and approximates the size and shape of a standard open-ended "crowfoot wrench". Typically, the wrench-headed section will have a 15 mm. opening (since that is the common spacing between the two flat sides 7 used to tighten the bearing spindle 4 to the crank arm 5). The plane of the wrench-headed section 25 is affixed at an approximate right angle to the horizontal lever section 26. The lever section 26 reaches outward past the end of the pedal's tread 3, above its axis of rotation. The lever section 26 serves the same purpose as the straight prop 2 inserted into a socket-bolt 1 by effectively extending the crank arm sideways far enough to contact the ground 13 when the bicycle is tilted over.

Figure 9:
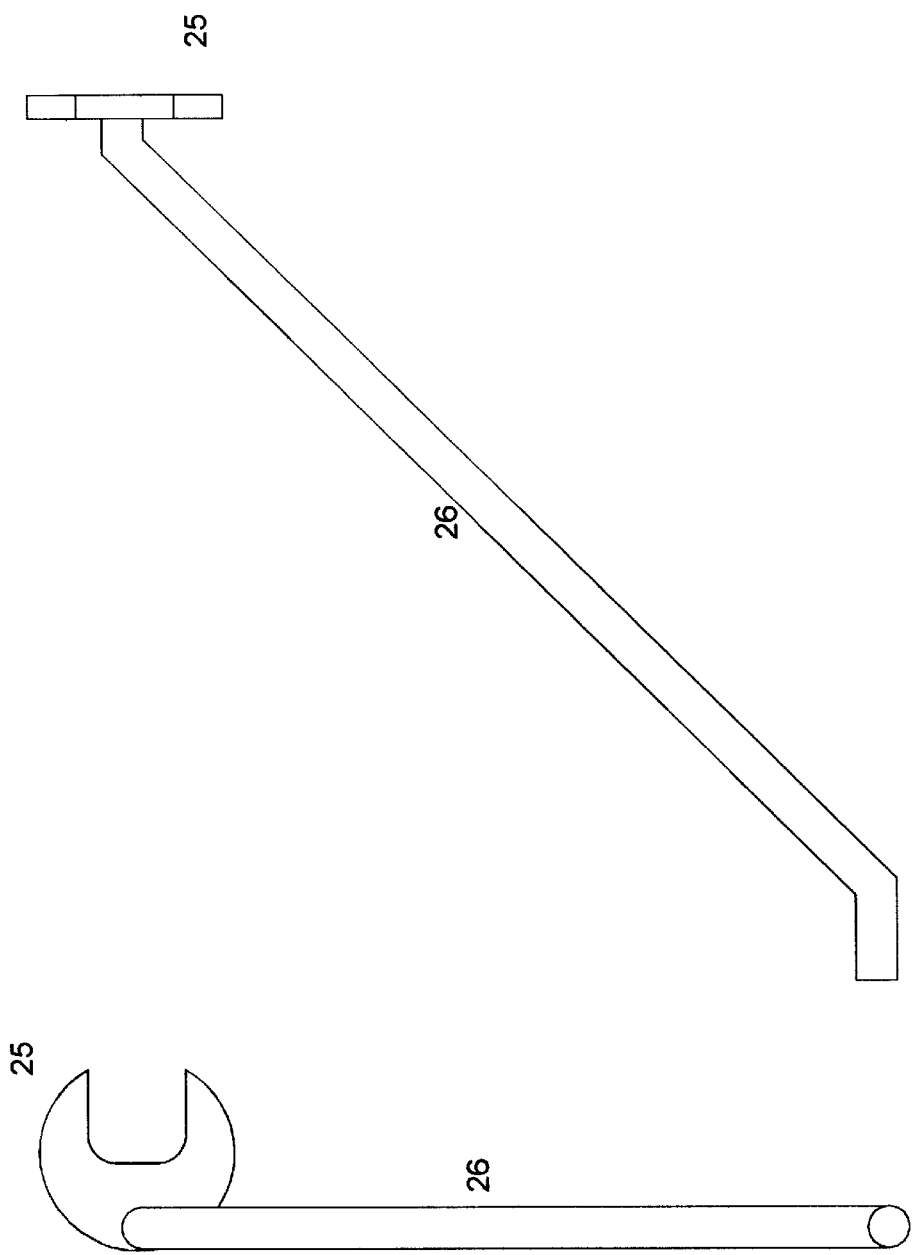
FIG. 9 illustrates another configuration of the "wrench-headed" prop embodiment, shown not affixed to the pedal's bearing spindle.

FIG. 9 illustrates a front and side view of the wrench-headed stand embodiment (not attached to a pedal). The lever section 26 is sloped at an oblique angle to the wrench-headed section 25, thereby attaining the ground more directly than shown in FIG. 8.

The wrench-headed section 25 clamps onto the inner portion of the bearing spindle 6 when bending moment generated in the lever section 24 is applied to it. Applying torque at right angles to the bearing spindle's axis causes the two sides of the open-ended wrench section 25 to bind against the spindle's flat sides 7. Once the wrench section has been clamped onto the inboard end of the pedal's bearing spindle 6, the long lever section 26 becomes solidly affixed to the bicycle's crank 5 and transmission assembly. The lever section 26 thereby acts as a bicycle stand in the same manner as a straight prop 2 affixed to the outboard end of the pedal's bearing spindle 4 by means of a socket-bolt 1.

The angular orientation of the bearing spindle's flat sides as well as their manufactured shape will both affect how well the wrench-headed section 25 clamps onto the two flat sides of the bearing spindle 7. If the flats were machined into the spindle such that they have distinct "shoulders" 8 which contact the outboard sides of the wrench-headed section 25 then it can be more easily clamped, regardless of the angular orientation of the flats 7. If shoulders 8 exist on the spindle 4, then twisting the wrench-headed section 25 produces better results because one side of the wrench-head will jam against a shoulder 8 while the other side of the wrench-head will jam against either the side of the crank arm 5 or one of the flat sides of the bearing spindle 7. If no shoulders exist on the bearing spindle, then the wrench-headed section 25 may bind against (and possibly damage) the rotateable pedal 3.

To prevent binding against the pedal, the user can use the adjustment shims 14 described earlier to adjust the angular orientation of the flats 7 such that they are at right angles to the plane of torque (i.e. the flats become substantially horizontal). Once the flats 7 are aligned horizontally, the opening wrench-headed section is engaged sideways onto the spindle. The user then leans the bicycle towards the ground such that the tip of the lever section 26 applies vertical torque to the wrench-headed section 25 thereby causing it to solidly bind onto the flats 7 on the bearing spindle 4.

Embodiments in Which the Prop Affixes to Newly Manufactured Pedals:

The embodiments described above may be retrofitted to either the inboard or the outboard end of existing bicycle pedals. An alternative to retrofitting the stand to existing pedals is to build new pedals that are specially constructed to receive the prop in an optimal manner.

Figure 10:
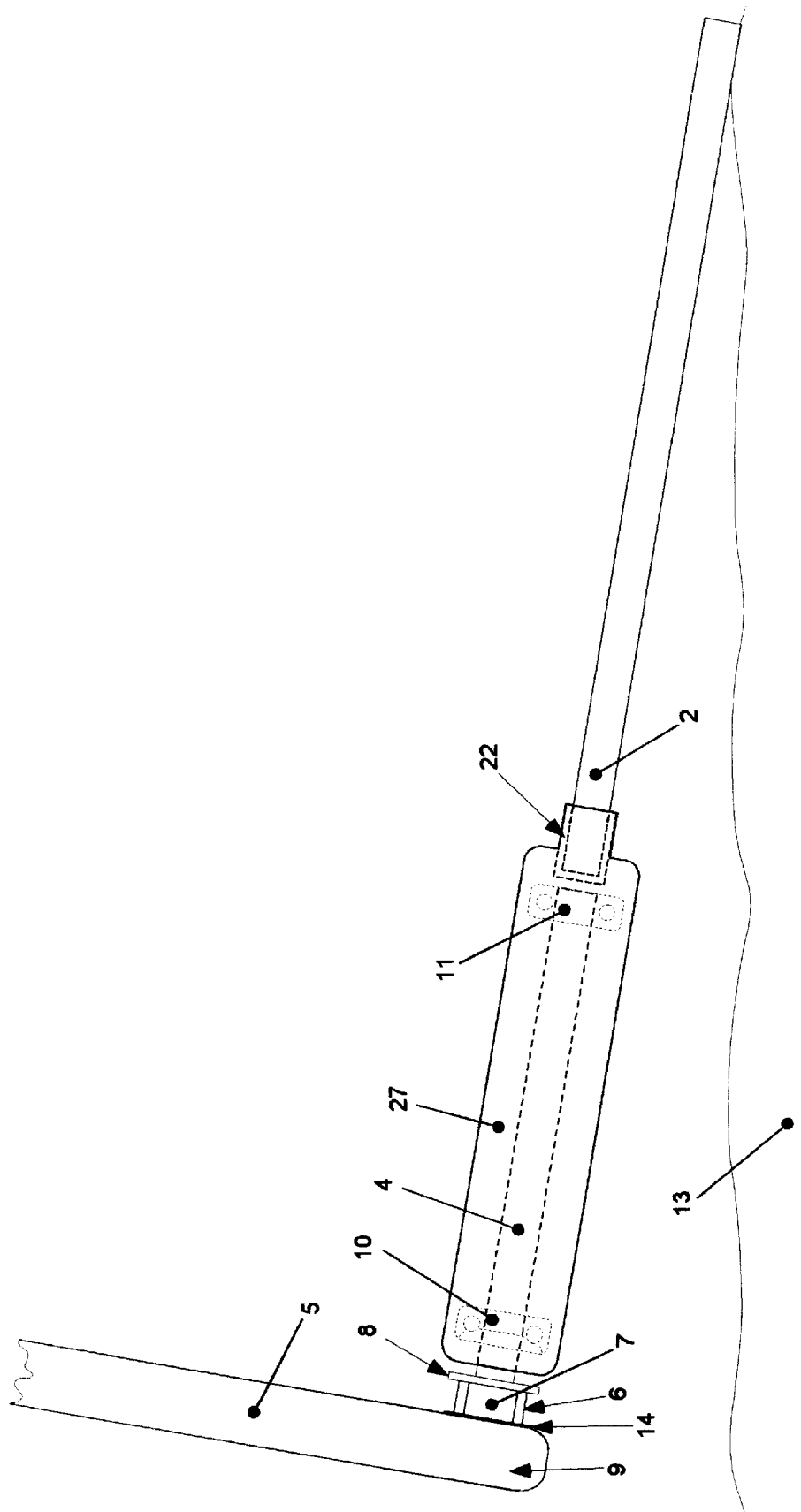
FIG. 10 illustrates the straight prop embodiment of the present invention, the prop being inserted to a socket that is fabricated integral to the pedal's tread member.

The simplest embodiment (illustrated in FIG. 10) utilizes a long straight prop 2, which provides a ground contact point that is coaxial with the pedal's axis of rotation. This embodiment has a specially constructed pedal having a socket 22 fabricated into the body of the tread 3 which receives the prop 2. The tread with integral socket is henceforth referred to as the "tread-socket" 27. As illustrated in FIG. 10, the socket 22 in the treadsocket 27 may be formed within a boss protruding from the outboard end of the treadsocket, thereby providing contact surface with the inserted prop 2 large enough to resist the prop's bending moment. FIG. 11 shows a similar tread-socket 27 wherein the socket 22 is formed flush with the body of the tread-socket to provide a narrower and more aesthetically pleasing pedal.

FIG. 10 illustrates the use of cassette style needle bearings 10, 11 which do not provide access to the bearing-spindle 4 from the outboard end of the tread 3 in order to adjust or secure the bearing. If access to the end of the bearing spindle is a design requirement for the pedal's bearing, it may be provided by a threaded dust-cap/socket assembly (shown in FIG. 19). The socket 22 is formed within a threaded dust-cap 16 and therefore effectively forms a monolithic tread-socket 27 once it is screwed securely into the tread. The dust-cap's socket 22 is deep enough to securely resist the prop's bending moment. The socket may house a magnet or similar prop retention system. The dust-cap and socket assembly 16, 22 may be tightened using a knurled outer edge for hand tightening (not illustrated). A slotted outer face that receives a screwdriver may also be provided for this purpose (not illustrated). The socket 22 may have a polygonal or a round cross-section.

There are a number of advantages inherent to the tread-socket embodiment of the pedal mounted bicycle stand:

a) There is no requirement for a modified dust cap 16 that rotates around the fixed socket-bolt 1 thereby avoiding its attendant sealing and friction problems.

b) The "tread-socket" embodiment is generally lighter than the more complex "socket-bolt" embodiment used to retrofit existing pedals.

c) The cost of fabricating a socket into the pedal's tread or dust-cap during manufacture is negligible.

Figure 21:
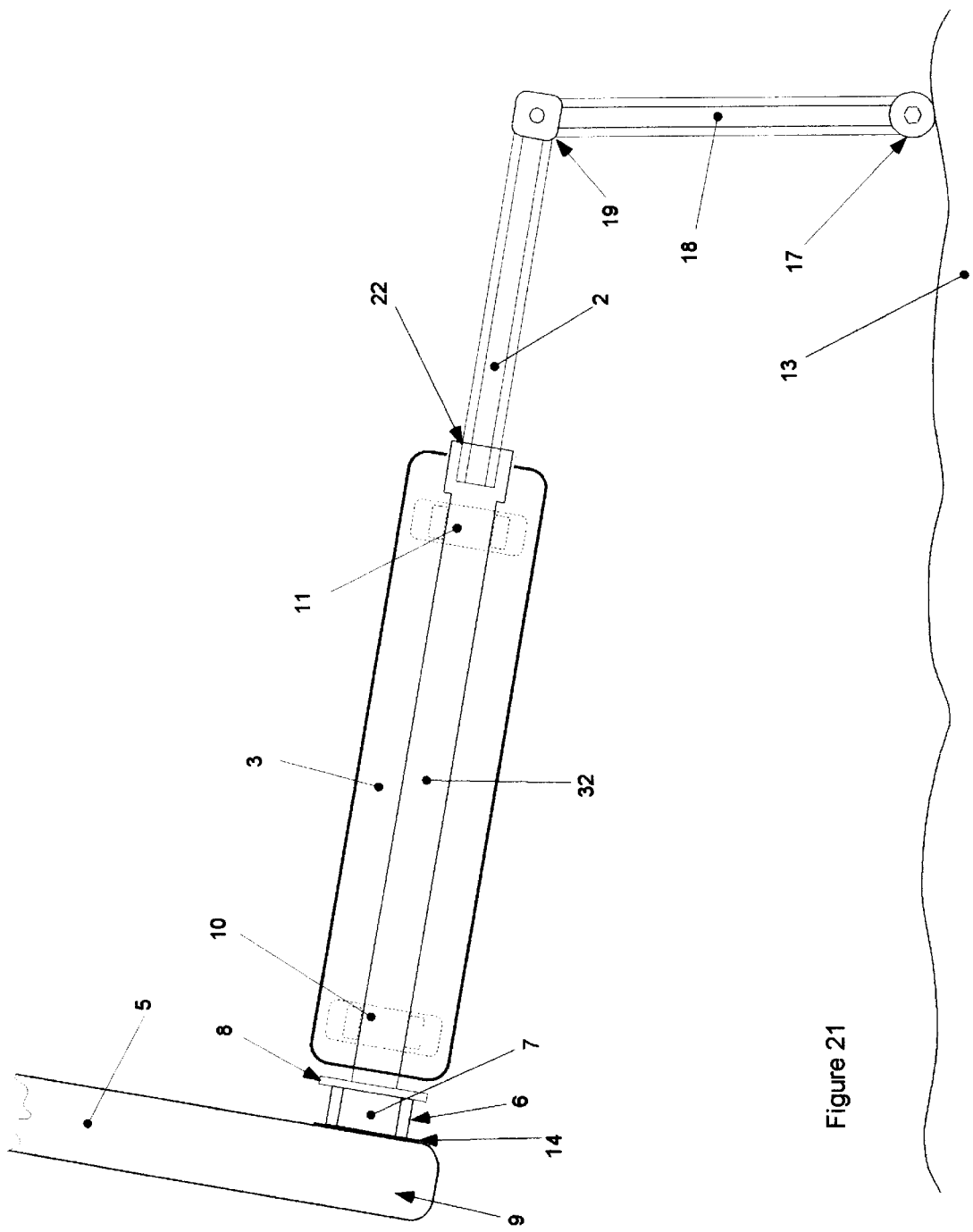
FIG. 21 illustrates the removable, foldable prop embodiment that affixes to the bearing spindle by means of a socket that's fabricated integral to the spindle.

In another embodiment (illustrated in FIG. 21), a removable prop assembly is affixed to the bearing spindle of newly manufactured pedals. The bearing assemblies 10, 11 may be "cassette style", needle-bearings that do not require a retention nut 24 at the outboard end. The pedal assembly is constructed such that the outboard end of the bearing spindle is exposed and sufficiently large that a suitable socket 22 can be formed on its outer face. The socket 22 is left exposed at the outboard extremity of the pedal assembly.

In another embodiment (illustrated in FIG. 18) the diameter of the spindle-socket 32 is large enough and the diameter of the prop 2 is small enough, that the socket 22 can be formed inside the narrowest portion of the spindle-socket 32 (i.e. the socket 22 extends inside the outboard bearing 11).

If the construction of the bearings is such that a lock nut is required at the outboard end of the bearing spindle, then a socket-bolt 1 and modified dust-cap 16 may be fitted during the pedal's manufacture. This spares the end-user the bother and expense of discarding the Original Equipment lock-nut 24 and dust-cap 16 and then retrofitting the socket-bolt 1 and modified dust-cap 16.

Figure 18:
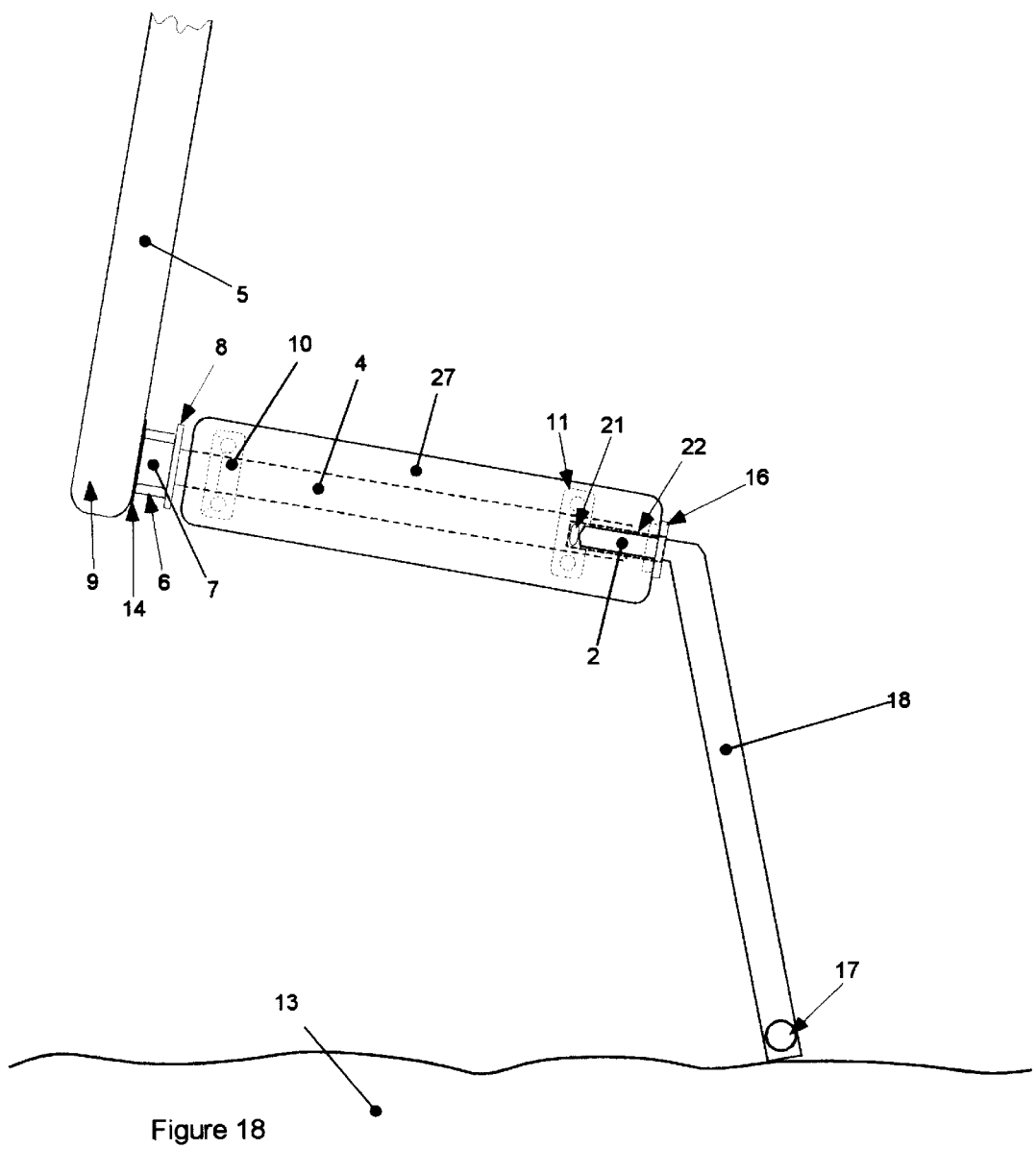
FIG. 18 illustrates a removable prop embodiment used in conjunction with orthogonal wheel blocking. The thin prop is shown inserted into a socket within the bearing spindle and illustrates a side view of the eccentric foot shown in FIG. 12.

The inserted prop 2 and matching socket 22 shown in FIG. 18 may have a polygonal cross-section, thereby providing a constraint that prevents the stand assembly from rotating. The inserted prop 2 and matching socket 22 shown in FIG. 18 may also have a round cross-section, thereby requiring an external means of preventing the stand assembly from rotating.

Figure 12:
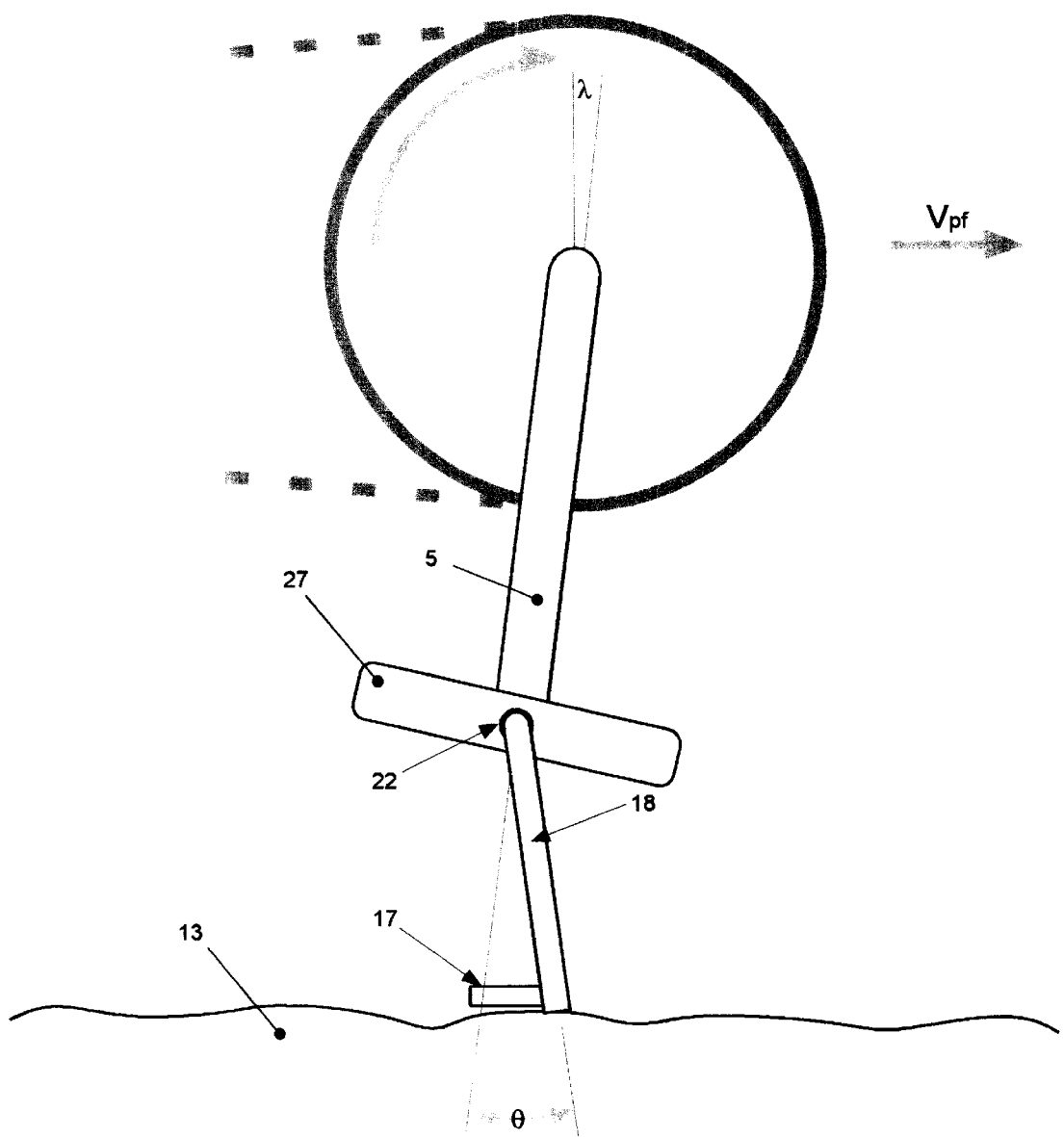
FIG. 12 illustrates the "L" shaped prop embodiment of FIG. 11, viewed axially onto the pedal, the prop hanging freely at the correct angular orientation with respect to the crank-arm.

Embodiments that Exploit the "orthogonal wheel blocking effect":

With reference to FIG. 12, it is evident that: if the bicycle is prevented from moving backward or forward then the pedal mounted stand becomes immune to destabilization due to prop rotation (the bicycle must advance with respect to the ground in order for the prop 18 to change it angular orientation). Under such "parking brake" conditions, the prop 2 does not need to be mechanically constrained from rotating with respect to the crank arm 5. One means of constraining the bicycle from advancing is to provide a supplementary "parking brake" device that fixedly activates the bicycle's caliper brakes. Other frictional "parking brake" embodiments could be devised that would also serve to stabilize a pedal mounted stand (e.g. a wedge that directly contacts a tire). However, frictional means of constraining the bicycle wheels from rotating add to the bicycle's complexity, weight and cost. The present invention utilizes a more efficient system to stabilize prop against rotation.

The required stabilizing force is generated if the stand's substantially vertical prop 18 is oriented with respect to the crank-arm 5 is such that it tends to pedal the bicycle forward as the bicycle's weight comes to bear on the stand. FIG. 12 illustrates the relative orientation of the crank-arm and prop 18 that generate a forward force vector $V_{pf}$. If the crank and prop are oriented such that both the angle $\theta$ and the angle $\lambda$ are greater than zero (and $\theta$ is also greater than $\lambda$), then a forward rotational force $V_{pf}$ will be applied to the bicycle's rear wheel. Rotational stability will be imparted to the pedal mounted stand if the forward force vector $V_{pf}$ generated by the pedal-mounted stand is opposed by an equal and opposite force vector. The opposing force vector to $V_{pf}$ must generated by some form of braking system that constrains forward motion of the bicycle.

The novel means and method used to impede forward frame motion is to turn the bicycle's front wheel approximately orthogonal to its frame prior to bringing the prop 18 into contact with the ground support surface 13. This orthogonal frame/wheel configuration renders the bicycle inoperative as a vehicle however, when used in conjunction with the prop geometry illustrated in FIG. 12, it provides a zero-cost, zero-weight prop-stabilizer. Turning the front wheel orthogonal to the plane of the bicycle is hereafter referred to as "orthogonal wheel blocking".

Figure 16:
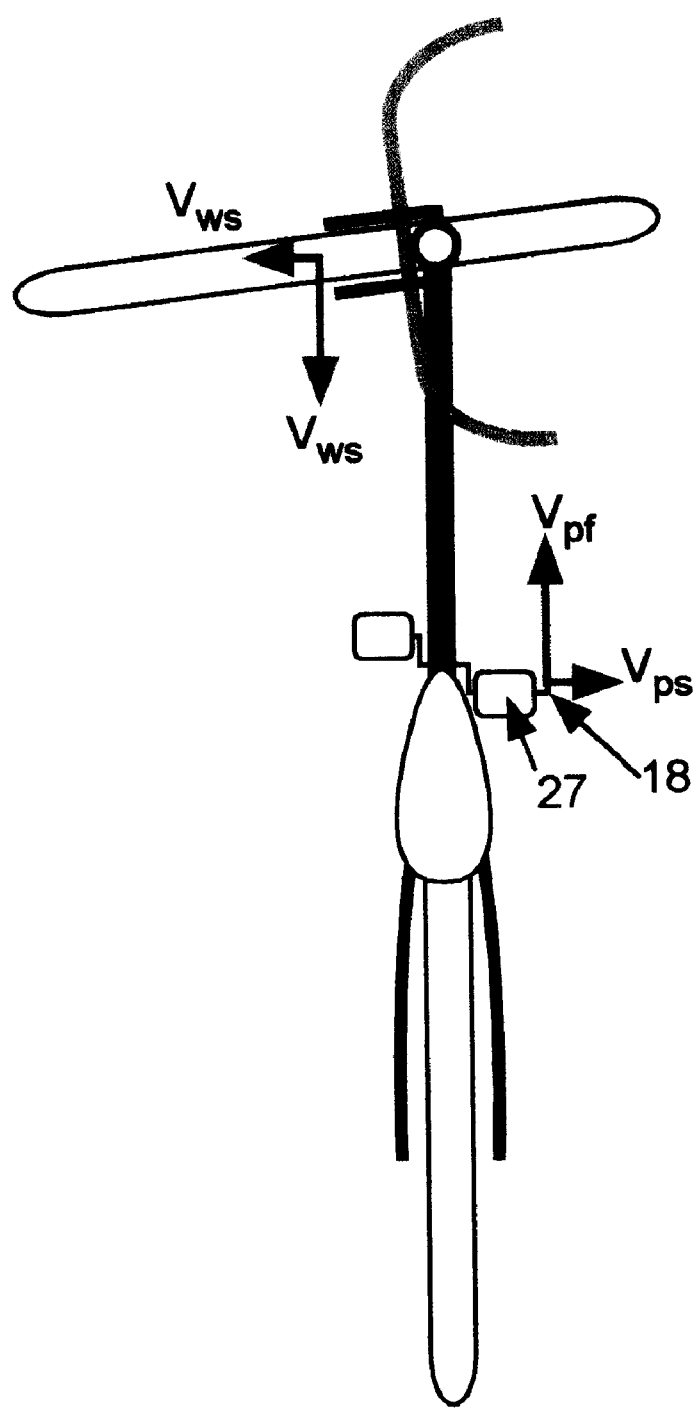
FIG. 16 illustrates a top view of a bicycle, showing how "orthogonal wheel blocking" generates force vectors that stabilize the pedal mounted stand.

Referring to FIG. 16: the closer to 90° the wheel is oriented with respect to the bicycle's frame, the more effective orthogonal wheel blocking becomes. To illustrate how orthogonal wheel blocking functions at angles near 90°, FIG. 16 shows the front wheel turned to within approximately 15° of orthogonality. The pedal's tread-socket 27 and its attached prop 18 are oriented such that the stand exerts a forward force vector $V_{pf}$ on the bicycle (see FIG. 12). An opposing force vector $V_{wf}$ is generated at the point where the front wheel contacts the ground. Since the front wheel is not perfectly at right angles, the front wheel will tend to roll with a side force of $V_{ws}$ however, since the prop is in contact with the ground and affixed at a constant angle with respect to the bearing spindle, a force vector $V_{ps}$ is generated and applied to the bicycle to oppose $V_{ws}$. Provided the wheel is first turned to within approximately 30 degrees of orthogonality, as the bicycle settles onto the prop 18, the wheel will be automatically drawn towards orthogonality with respect to the frame and the four force vectors $V_{pf}$, $V_{wf}$, $V_{ws}$ and $V_{ps}$ will automatically adjust until mechanical stasis of the bicycle is achieved.

Turning the front fork away from the side of the bicycle on which the stand is installed results in the strongest orthogonal wheel blocking effect (as shown in FIG. 16). The bicycle's front fork rake angle, its head tube angle, the front wheel diameter, and the front tire's rolling friction all affect how closely the wheel will be drawn to orthogonality and how strong the orthogonal wheel blocking effect will be. Embodiments of the present invention can be deployed on most bicycles such that enough orthogonal wheel blocking effect is generated that no additional rotational constraint need be applied in order to achieve adequate stand rigidity.

Since no torsional locking to the bearing spindle is required, both the socket 22 and its inserted prop 2 may have a round cross-section. The weight of the substantially vertical segment of the prop 18 and its optional foot-member 17 cause the prop assembly to swing and hang vertically, its angular orientation being independent of the angular orientation of the tread-socket 27. Gravity automatically orients the prop 18 at the correct angle with respect to the crank-arm 5 as the pedal is positioned just aft of bottom dead center.

To minimize turning friction that might inhibit the prop 18 from automatically swinging to its optimal orientation, the inserted prop may have a convex end, thereby reducing the prop's contact surface against the retention magnet 21 (illustrated in FIG. 18).

To further reduce turning fiction, the inserted prop 2 may have a polygonal cross section, thereby reducing its contact surface against the cylindrical wall of the socket 22 (not illustrated). The interstices between the polygonal prop 2 and the cylindrical socket wall 22 also provide room for dirt to accumulate without jamming the bearing action. Inserting a round prop into a polygonal socket achieves the same anti-friction benefits.

Referring to FIG. 12, it is evident that, provided that the crank-arm 5 is oriented at least slightly aft of bottom dead center (i.e. $\lambda>0$), the prop 18 can hang vertically and the stand will function adequately. Therefore, a symmetrical prop 2, 18 (as shown in FIG. 19) will hang vertically from the socket 22 and adequately support a bicycle configured to generate orthogonal wheel blocking force vectors $V_{pf}$, $V_{wf}$, $V_{ws}$ and $V_{ps}$.

If however, the prop is inclined slightly counterclockwise with respect to the vertical (as shown in FIG. 12), then the stand will be somewhat easier to deploy and provide somewhat better stability. The improved stability is caused by the angled prop 18 applying somewhat more propulsive force to the crank-arm 5. If the crank is oriented at a small angle $\lambda$ then the non-vertical prop provides extra propulsive force $V_{pf}$. The increase in $V_{pf}$ provides a stronger and more stable orthogonal wheel blocking effect, thereby permitting the operator to reliably use a wider range of crank arm orientations than if the prop is left to hang precisely vertical.

To aid the user to achieve optimal angular orientation, a preferred embodiment of the prop is asynmmetrically constructed. The foot 17 is asymmetrically affixed to the lower end of the prop 18 such that it cantilevers towards the rear of the bicycle (illustrated in FIG. 12). The prop's asymmetrical construction causes gravity to automatically swing it counterclockwise to the desired angular orientation shown in FIG. 12. To enhance the cantilever's effect, the substantially vertical prop 18 may be fabricated from lightweight material such as aluminum tubing while the cantilevered foot 17 may be fabricated from heavier material such as solid steel. To further enhance the efficiency of the cantilevered swinging mechanism, the foot 17 may be tapered to shift its centroid further away from the prop 18.

Referring to FIG. 11: the prop 18 may protrude through the foot 17 to form a protrusion on its bottom surface. Since the protruding prop is the first point to contact the ground as weight comes to bear on the stand, it insures that the prop "sets" into the support surface 13 at the desired angular orientation. Once the protruding tip of the prop 18 has engaged the ground, it may continue sinking into a soft support surface 13 until the broader surface of the foot 17 has engaged and distributed the load.

Figure 13:
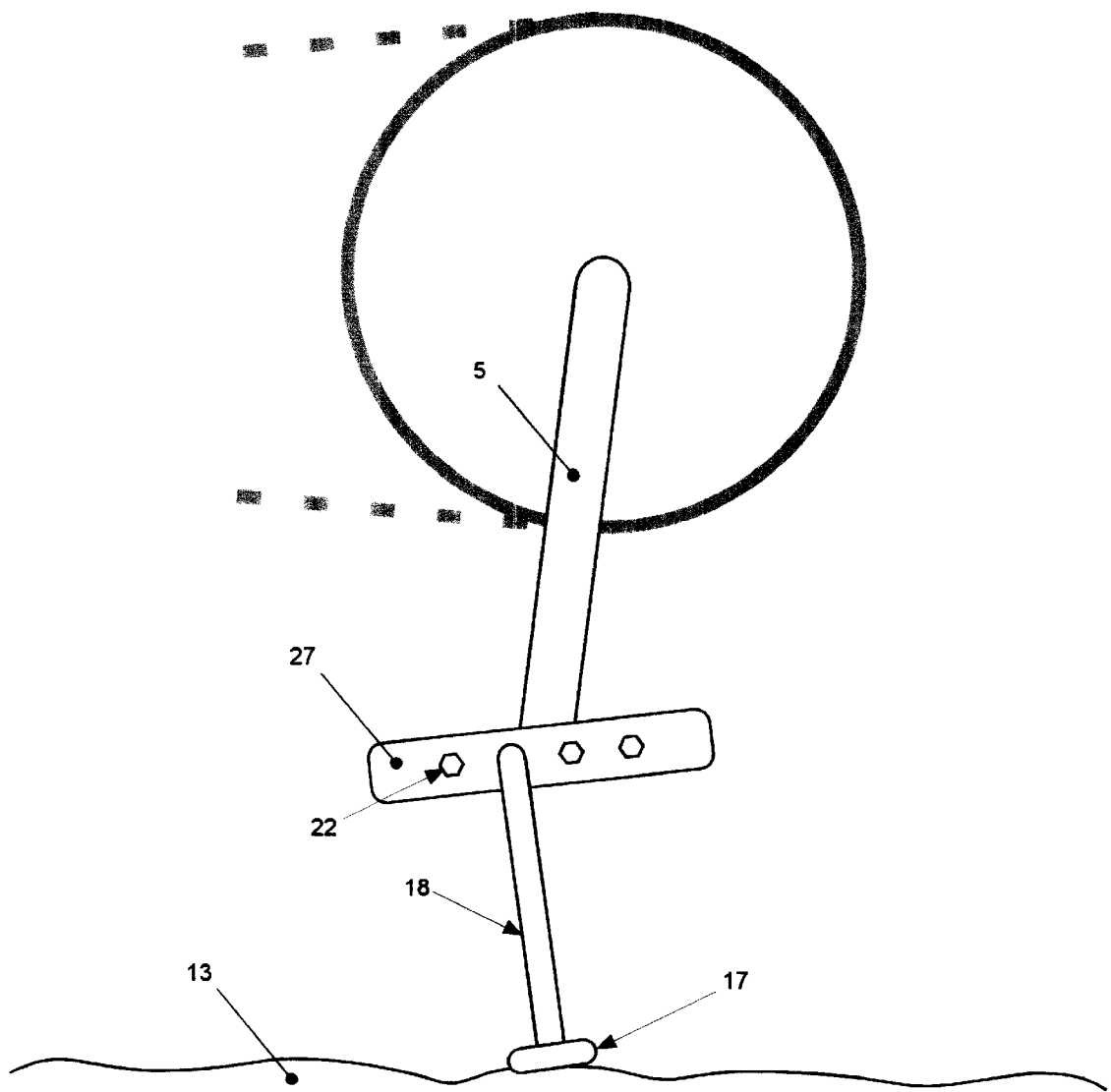
FIG. 13 illustrates an "L" shaped prop embodiment of the present invention, the prop being inserted into a polygonal socket in the outboard edge of the pedal's tread member.

FIGS. 10, 11, 12, 18 and 19 all illustrate preferred embodiments in which a round socket 22 is fabricated in the outboard edge of the tread-socket 27, such that the socket's axis is coaxial with the pedal's bearing spindle 4. Other preferred embodiments may be configured using one or more polygonal sockets along the outboard edge of the treadsocket, each socket being formed such that its axis is parallel to the bearing spindle. FIG. 13 illustrates a treadsocket 27 having a multiplicity of hexagonal sockets 22 fabricated into its outboard edge (thereby reducing the weight of the pedal). The inserted prop 2 has a matching hexagonal cross-section that constrains rotation with respect to the tread-socket 27. The user selectably inserts the prop into one of the sockets aft of the bearing spindle's axis. Since the sockets are eccentric to the pedals bearing spindle, gravity will cause the pedal assembly to automatically rotate to a point of equilibrium. To use this embodiment, the user inserts the polygonal prop 2 into the socket 22 that causes the assembly to hang with the prop correctly oriented (as illustrated in FIG. 13).

Figure 17:
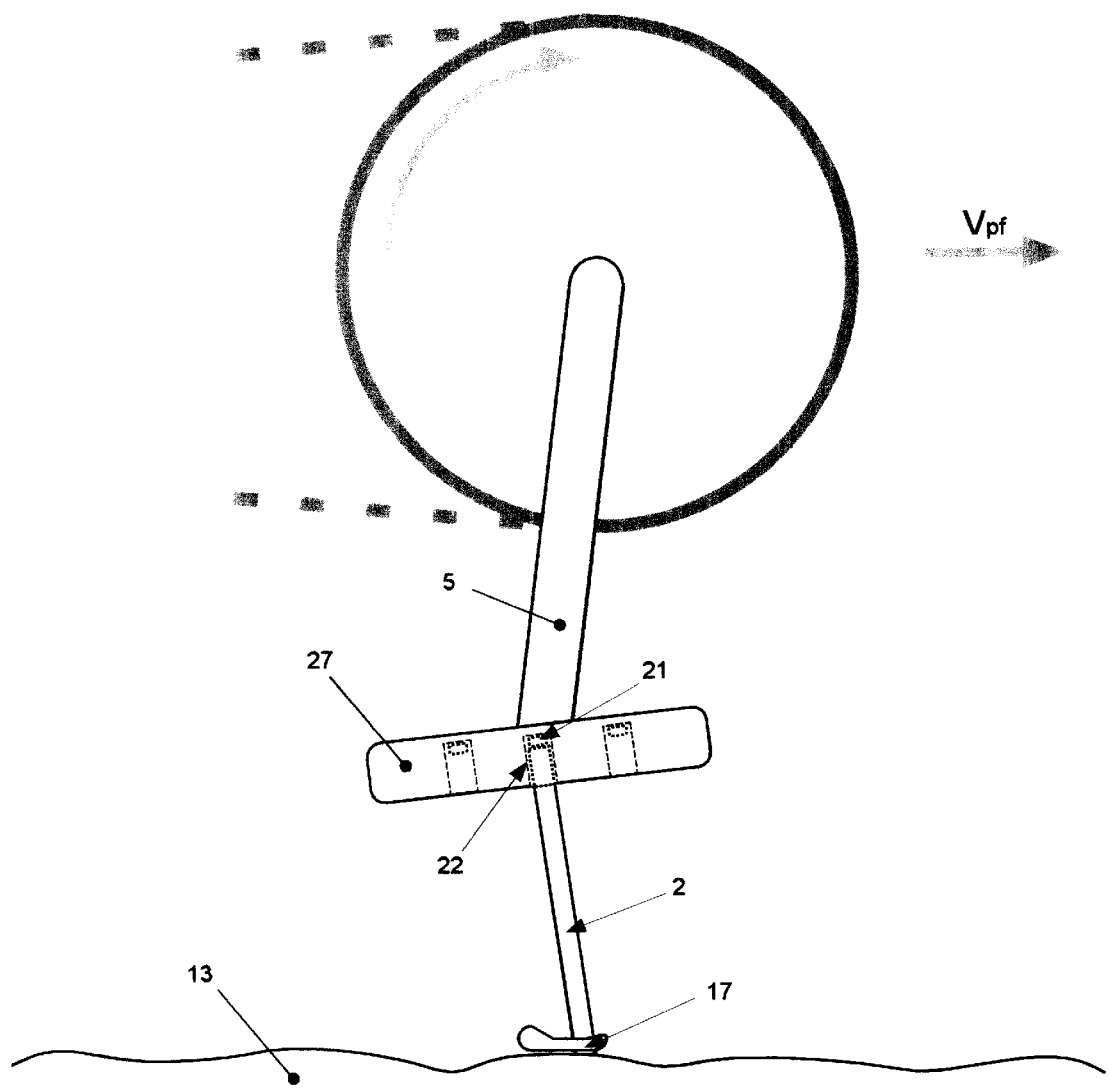
FIG. 17 illustrates a removable, straight-prop embodiment, the prop shown inserted into the lower surface of the pedal's tread.

In another embodiment (illustrated in FIG. 17) the socket opening 22 is situated on the lower surface of the pedal's tread 3 rather than on its outboard edge. Since the axis of the socket 22 can be oriented towards the ground simply by rotating the socket-tread 27, the prop assembly does not require an "L" shape in order to direct the prop towards the ground. It is therefore comprised of a straight insertable section 2 and an (optional) foot 17. Viewed from the top (not illustrated) the socket 22 is located as far outboard as possible on the pedal, thereby insuring that the lower end of the inserted prop is as far from the bicycle as possible. To further improve the prop's support geometry, the socket may be angled outward within the plane of the tread such that the inserted pro-member 2 projects its lower end further away from the bicycle. In FIG. 17, the prop-member 2 is shown inserted into a centrally located socket 22 and an eccentrically mounted foot 17 is used to rotate the stand to the optimal angular orientation for exploiting orthogonal wheel blocking.

Two eccentrically located sockets 22 are also shown in FIG. 17. A symmetrical prop assembly is inserted into the rear socket, thereby eccentrically loading the pedal and causing it to hang at an angle that optimizes the orthogonal wheel blocking effect. If the pedal assembly is mounted onto the opposite side of the bicycle then the user can insert the prop into the other eccentric socket.

Figure 14:
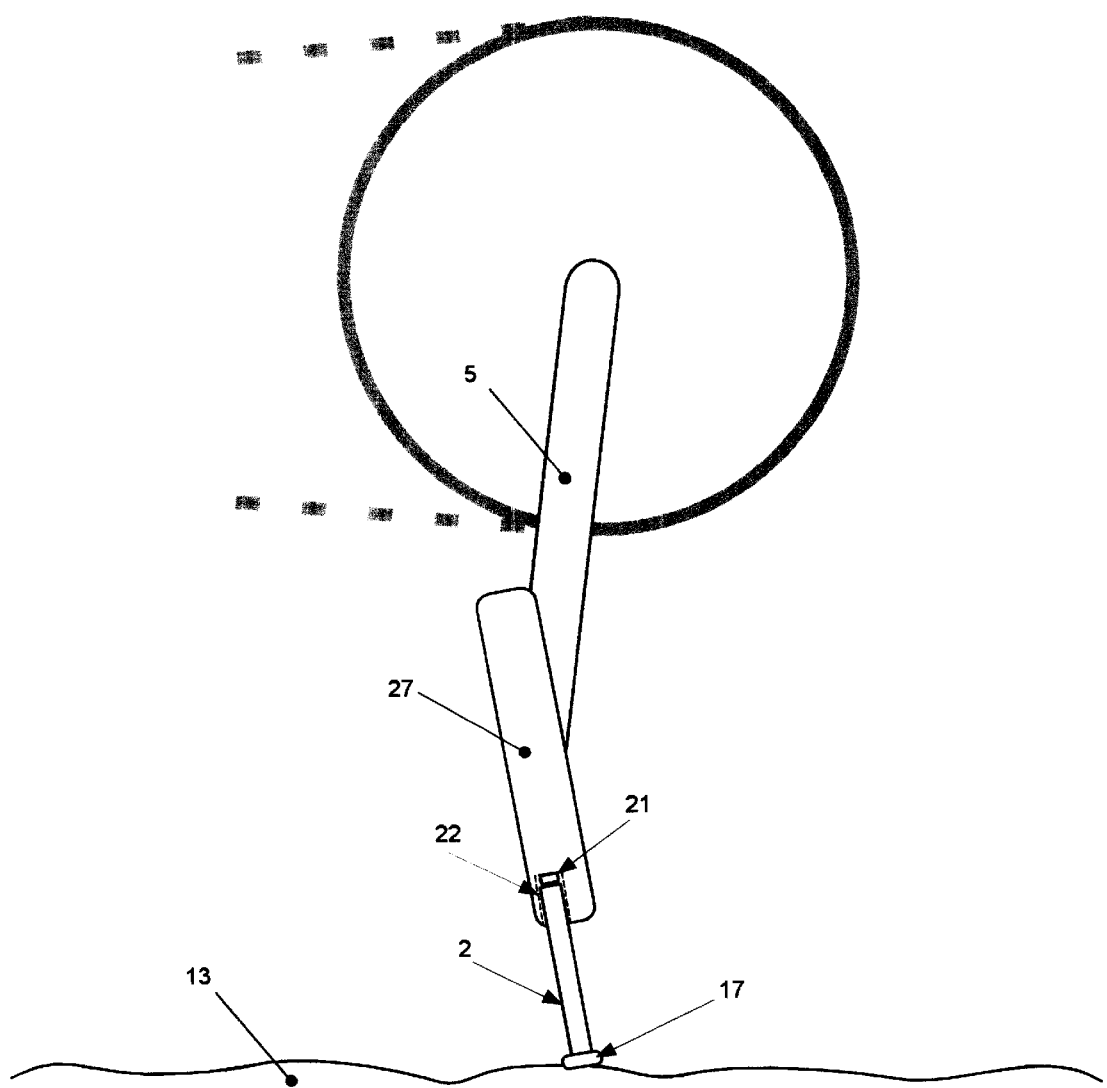
FIG. 14 illustrates a removable straight prop embodiment of the present invention, the prop shown inserted into a socket in the leading edge the pedal's tread member.

Other preferred embodiments may be configured using a socket 22 formed into the front and/or rear edge of the pedal tread, thereby causing the inserted, straight prop 2 to lie in the plane of the tread-socket assembly 27. FIG. 14 illustrates a socket 22 formed in the rear edge of the tread. Viewed from the top (not illustrated) the socket 22 is located as far outboard as possible on the pedal, thereby insuring that the lower end of the inserted prop is as far from the bicycle as possible. To further improve the prop's support geometry, the socket may be angled outward within the plane of the tread such that the inserted prop 2 projects its lower end firther away from the bicycle. Preferably, the inserted prop 2 is straight. Since no torsion is applied to it, the socket 22 may be round. Since gravity will more easily pull the prop 2 out of its near vertical socket 22, the prop retention means (e.g. magnet 21) are made somewhat stronger thereby preventing the prop 2 from inadvertently falling out before the bicycle can be tipped onto the stand. As shown in FIG. 14, the socket 22 may be eccentrically located with respect to the center plane of the tread, thereby causing the inserted prop to automatically hang at an orientation angle that optimizes the orthogonal wheel blocking effect.

FIGS. 14 and 17 illustrate a short, straight, removable prop 2 that must be removed and stored away from the pedal during pedaling activity (various storage means are described below). Typical pedal dimensions and ground clearance dimensions permit the prop 2 to be stored within the body of the pedal's tread 3. Storing the prop within the pedal assembly adds to its reciprocating weight however it improves the stand's ease of use. This embodiment is therefore better suited for use on large touring pedals rather than smaller racing pedals. Telescopic and pivoting means are disclosed for storing the prop within the pedal.

Figure 15:
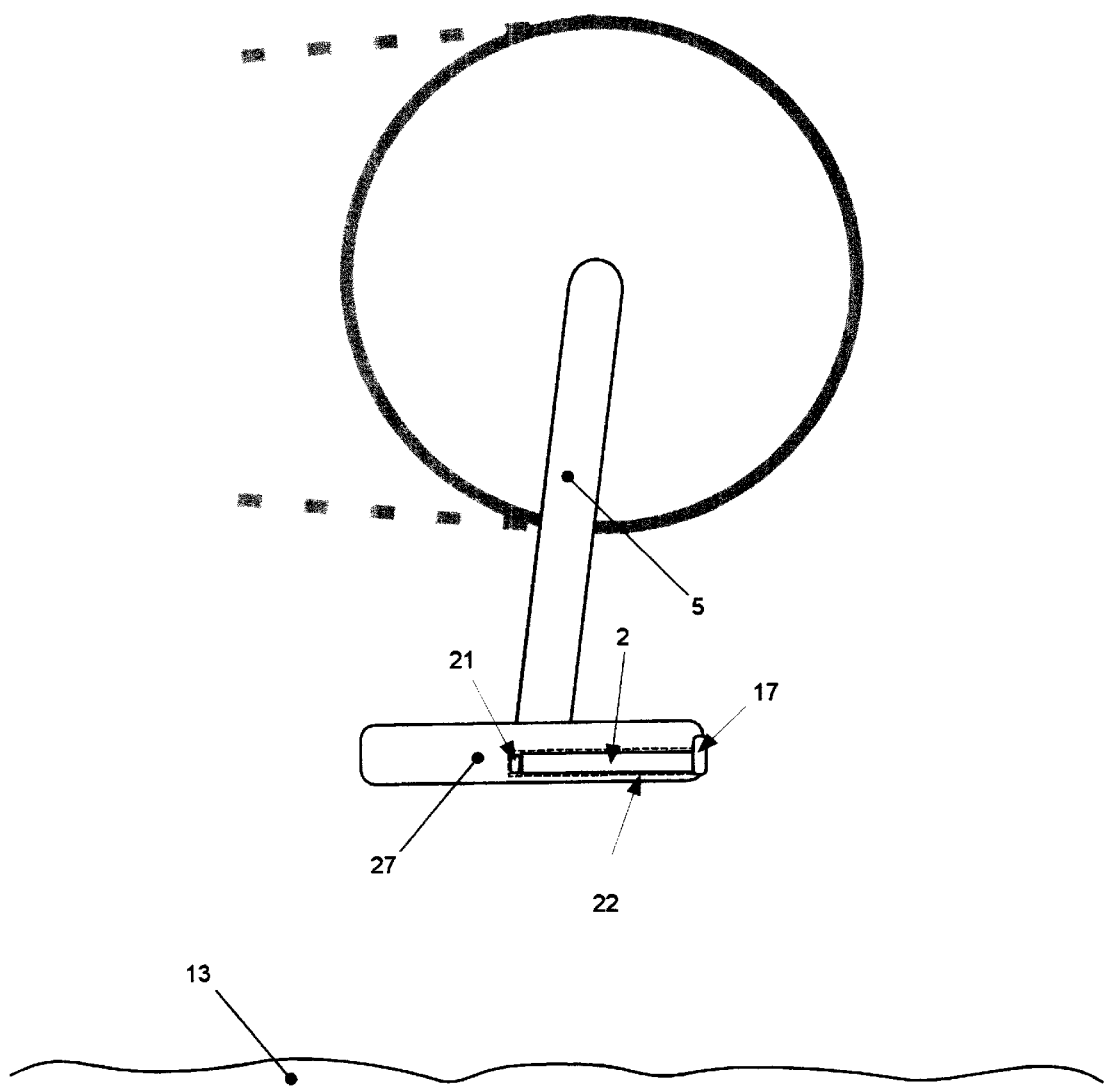
FIG. 15 illustrates a straight prop embodiment of the present invention, the prop shown telescopically stored within a socket in the leading edge the pedal's tread member.

A telescopic means of storing the prop within the pedal assembly is illustrated in FIG. 15. The socket 22 is deep enough to permit the straight prop 2 to be completely inserted into the tread-socket 27 for storage while the pedal is being used to propel the bicycle. The foot 17 retracts flush into a suitably formed indentation in the side of the treadsocket 27. The socket 22 may be eccentrically located with respect to the center plane of the tread, thereby causing the inserted prop to automatically hang at the optimal orientation angle for producing the orthogonal wheel blocking effect. Suitable retention means are installed within the socket 22 for securing the prop 18 in either its retracted, storage position or in its operative, extended position. One means of providing this locking function (not illustrated) is to form a small protrusion on the side of the prop 2 near its inner end. This protrusion rides in a groove along the length of the socket wall. The groove has side-channels which enable the user to twist the prop to engage the protrusion into a side-channel, thereby locking the prop at various extension lengths. Other expansion type means of locking the telescoping prop within the socket (also not illustrated) are obvious to those practiced in the art.

Storing the Removable Prop During Transit:

Several means for storing removable props on the bicycle are disclosed:

Storage of a Straight Prop:

1) The removable straight prop can be stored on the bicycle using attachment means that holds it alongside one of the bicycle's frame tubes. For example, two springloaded clips attached to any straight section of the bicycle's frame can be used to temporarily grip the prop (not illustrated). The pair of threaded holes normally provided in the bicycle frame for affixing accessories such as a water bottle cage also provide convenient mounting points for prop retention storage clips.

2) In a preferred embodiment (not illustrated), magnets affixed to the prop are used to secure it to one of the bicycles frame tubes. The standard water bottle cage mounting screws are one location where magnetic clinging means can be affixed to the bicycle. Two "standoff" blocks made of magnetically attractable metal and somewhat thicker than the prop are affixed between the water bottle cage and the bicycle's frame by means of holes in the standoff blocks through which the bottle cage's two mounting screws pass. Magnets are affixed to the prop at a distance equal to the spacing between the two standoff blocks. Alternatively, the two magnets are affixed to the standoff blocks and the prop is made of magnetically attractable material. To store the prop, the user withdraws it from the pedal's socket and magnetically snaps it to the metal standoff blocks located under the water bottle cage.

3) In a preferred embodiment, the removable, straight prop is stored using attachment clips that hold the straight prop under the bicycle's seat. Due to the limited dimensions of a bicycle seat, this embodiment is best suited for use with a compact prop such as illustrated in FIG. 11. Various prop attachment means (not illustrated) may be provided. For example, frictional clips may be attached along one of the two horizontal rails normally used to attach the seat to the seat-post. The clips have spring-loaded jaws that temporarily grip the prop. Alternatively, a clip or clips are affixed to the underside of the seat shell that temporarily grip the prop.

4) In another embodiment (not illustrated), the straight prop is stored inside the bicycle frame's seat tube. The tubular seatpost has clips, magnets or similar retention means affixed to its inside surface and the straight prop has matching retention means affixed to it which enable the prop to temporarily cling to the inside of the seatpost. To store the straight prop, the user releases the seat clamp and withdraws the seat and seatpost from the frame's seat tube. The prop is then inserted into the open end of seatpost and secured to the retention means provided therein. The seatpost is then be resecured inside the seat tube, thereby permitting the attached straight prop to be conveniently transported to its next deployment site.

Storage of an "L" Shaped Prop:

1) FIGS. 4a and 4b illustrate a preferred embodiment of the prop storage means. The "L" shaped prop folds at the joint 19, thereby transforming the prop assembly into a short, straight assembly that can be stored using any of the methods previously described for straight props. Once folded, the prop can also be more easily stored in the user's pocket, knapsack, toolkit etc.

2) In another embodiment, the non-foldable, "L" shaped prop is attached to the frame using the water bottle cage attachment points (in a manner similar to that already described for the straight prop). The prop's attachment points are located on the longer of the two "L" sections such that the shorter of the two is oriented upwards. The attachment points position the prop's upright (shorter) section such that it just clears the end of the water bottle cage.

3) In another embodiment (not illustrated), the "L" shaped prop has a quickconnect fixture at its bend instead of a folding joint. When disassembled into two separate members, it can be more easily stored in the users pocket, knapsack, toolkit etc.

Figure 7:
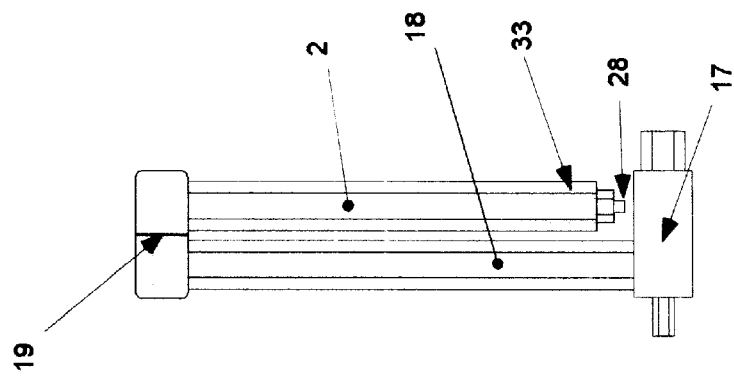
FIG. 7 illustrates a right side elevation of the folding prop-member in its tool-bit holder mode.
Figure 6:
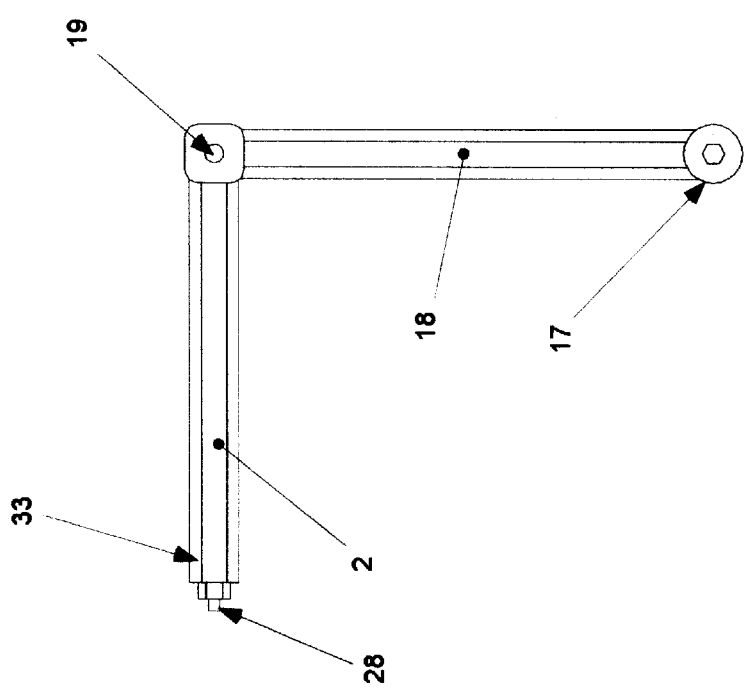
FIG. 6 illustrates a front elevation of the folding prop in its tool-bit holder mode.
Figure 5:
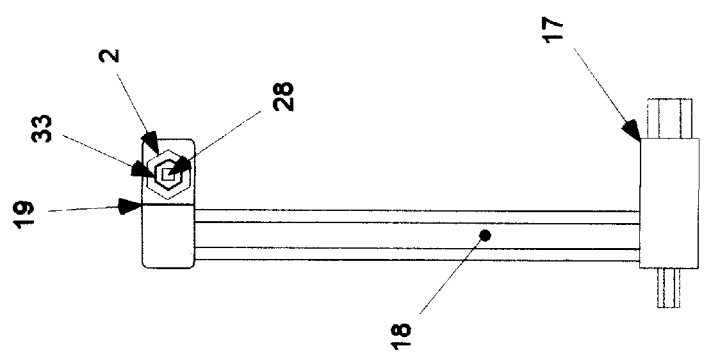
FIG. 5 illustrates a left side elevation of the folding prop in its tool-bit holder mode. For illustrative purposes, a Robertson screwdriver bit is inserted into the upper folding prop.

Embodiments that Act as a Mechanic's Toolkit:

The present invention's principal function is to act as a bicycle stand however its prop can also be configured to serve as lever to apply torque to toolbits. Several embodiments of the toolkit are disclosed:

1) FIGS. 5, 6 and 7 illustrate an embodiment comprised of a folding prop that also serves as part of a bicycle toolkit. The prop 2 may be formed with a polygonal cross-section that permits it to temporarily affix to toolbits such as Allen-head screws, Torx screws or nut-drivers. Once affixed to a toolbit, the prop may be used as a lever to apply torque to it.

The foot 17 may be constructed of lengths of rod having a hexagonal cross-section that's identical to the socket sizes of the Allen head screws most commonly used in various bicycle components. For example, three common Allen key sizes used on bicycles are 8 mm, 6 mm. and 4 mm. To form a useful toolkit, the substantially horizontal and vertical sections of the prop 2 and 18 are fabricated from 8 mm. hexagonal stock and the two sides of the "T" shaped foot 17 would be fabricated from 6 mm. and 4 mm. stock respectively. The user inserts the 8 mm. end of the prop 2 into the pedal's socket-bolt 1 or treadsocket 27, thereby securing the prop in its operational (bicycle stand) position. When used in its "toolkit mode", the substantially vertical section 18 can be used as a handhold for applying torque to any of the three available hexagonal driver tips. The user could also use the inserted "L" shaped prop to apply torque to tighten the socket-bolt 1 onto the bearing's cone-nut during its initial installation and while fine-tuning the socket-bolt's angular orientation (using shims 15).

When not being used as a bicycle stand, any of the three accessible hexheads can be used to tighten or loosen any 8, 6 or 4 mm Allen head bolt on the bicycle. This foot configuration thereby permits the "L" shaped prop to serve as a more useful component of the bicycle's toolkit.

In a preferred embodiment, the substantially horizontal section 2 may have a socket 33 fabricated into its end that receives a standard screwdriver toolbit 28 (typically a ¼" hexagonal rod a formed head). The toolbit 28 affixed inside the prop 2 can be torqued in the same manner as that described above for toolbits affixed to the outside the prop 2.

In order to minimize its weight, the prop's cross-sectional area should be just large enough to provide adequate strength to fulfill its role as a bicycle stand. If that cross-sectional area is not large enough to accommodate the desired size of toolbit driver socket 33, then a toolbit 28 may be temporarily affixed by means of a male to female socket converter 34. The socket converter is used to temporarily form the necessary toolbit socket 33. FIG. 23 illustrates one embodiment of a socket converter 34 comprised of a barrel with sockets fabricated into each end. The socket in one end of the converter receives the prop 2 while the socket at the other end receives the toolbit 28.

FIG. 22 illustrates an alternate means of temporarily creating the desired toolbit driver socket 33. This embodiment of the socket converter 34 has a hexagonal socket 33 that extends its entire length. When the bicycle stand function is required, the socket converter 34 may be slid back along the unfolded prop 2 to expose its end for insertion into the socket-bolt 1. When the prop is folded for transport (FIG. 23), the socket converter 34 is conveniently stored as an integral part of the folded assembly. Suitable internal stop mechanisms (not illustrated) may be used to limit the travel of the socket converter 34 such that it can be positively moved in to its storage/stand position or out to its toolbit holder position.

Figure 20:
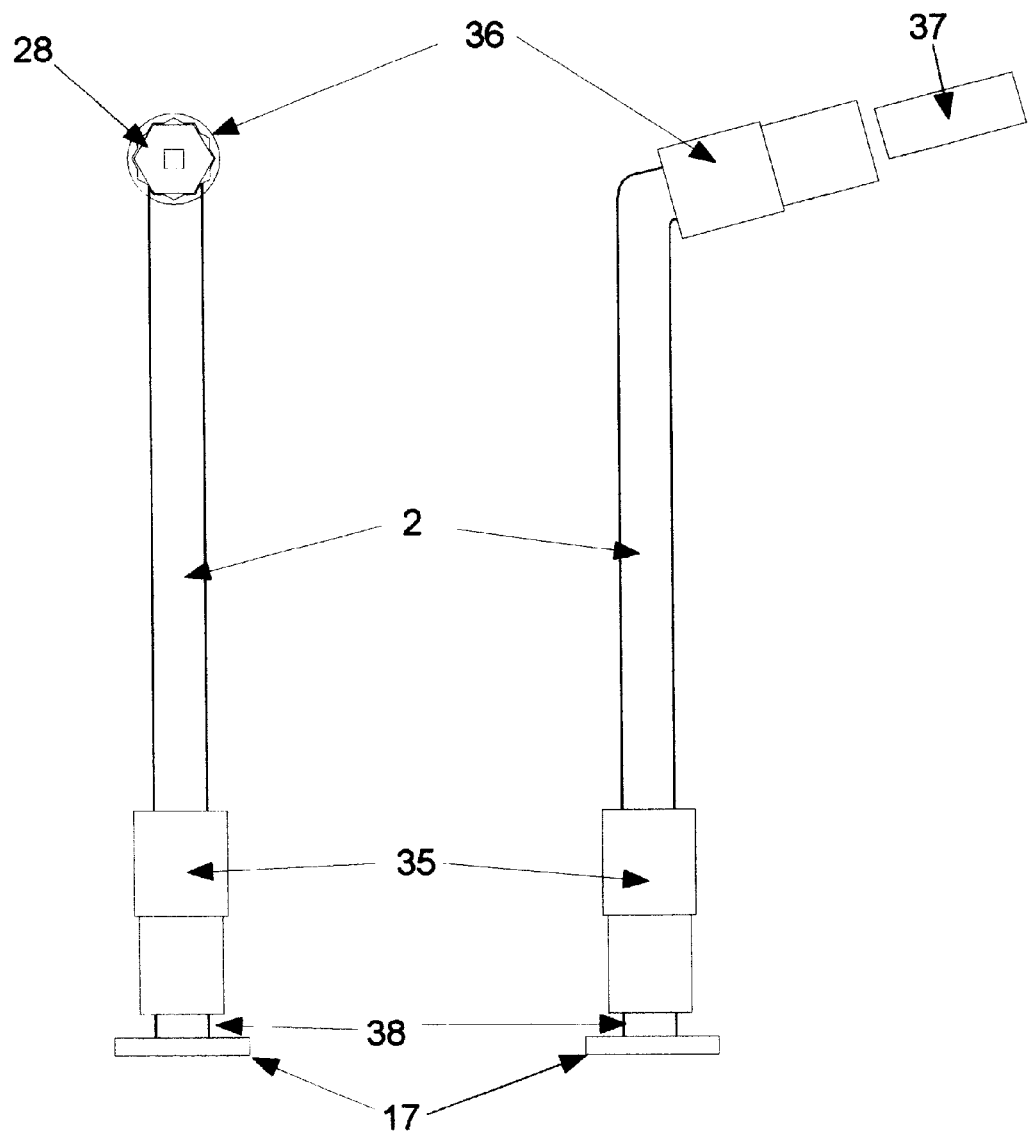
FIG. 20 illustrates the prop configured for mating with standard ¼" sockets and toolbits thereby serving as a toolkit as well as a stand.

2) In another embodiment illustrated in FIG. 20, the "L" shaped prop 2 is fabricated from ¼" square material, thereby permitting standard ¼" drive nutdrivers 35, 36 to be to be affixed at both its ends. Both nut-drivers have ¼" hexagonal sockets that may receive standard screwdriver bits, Allen-head bits etc. The nut-driver providing the lever arm distance most appropriate to the job at hand is selected for toolbit insertion. When converted for use as a stand, the foot 17 is temporarily affixed to the lower nut driver 35 by means of an attached hexagonal extension 38 that clips into the nut-driver. The left image in FIG. 20 shows a hexagonal Robertson screwdriver toolbit affixed within the nut-driver 36, thereby enabling the prop 2 to act as a toolkit. The right image in FIG. 20 shows the upper nut-driver 36 receiving one end of a cylindrical prop extension bit 37 whose opposite end inserts into either the tread-socket, socket-bolt or dust-cap socket (none illustrated). The prop extension bit 37 thereby selectably joins the prop and pedal to act as a stand.

3) In another embodiment, the substantially horizontal section of the folding "L" shaped prop is incorporated into a multi-function pocketknife/toolkit of the "Swiss Army Knife" style (not illustrated). An example of this embodiment is a folding Allen Key or round shaft that is stored in the body of the knife alongside the knife blade, screwdriver, corkscrew etc. When the bicycle stand function is desired, the user unfolds the insertable prop 2 and inserts it into the socket 22. The main body of the pocketknife/toolkit extends downward from the outboard end of the unfolded prop 2 and thereby serves as the substantially vertical section 18 of an "L" shaped prop.

FIGS. 22 and 23 illustrate another embodiment that converts the folding prop 2, 18,19 into a multi-function toolkit. Each of the prop's two folding members 2, 18 extends somewhat past their common pivot point 19 to form a cantilevered jaw 35. Together, the two cantilevered jaws 35 form the gripping end of a pair of pliers, thereby adding versatility to the toolkit.

Although the present invention has been described with reference to particular illustrative examples, it is recognized that various minor mechanical modifications are possible when implementing its inventive concepts.

What is claimed is:

1. A bicycle stand for supporting a bicycle through a pedal, the bicycle stand comprising a prop member and prop receiving means, the prop member for selective engagement with the prop receiving means and the prop receiving means for selective engagement with the pedal, the prop member including a lug end portion for mating engagement with the prop receiving means and a foot portion adapted for contact with the ground, the foot portion eccentric with respect to the lug end portion and wherein the prop receiving means is adapted for operative attachment to the pedal coaxially with the pedal spindle, the prop receiving means having a bore having a depth sufficient to receive the prop member and to support a bending moment of the prop member with respect to the prop receiving means to support the bicycle wherein the bore is further adapted to allow rotational movement of the prop member with respect to the prop receiving means.

2. A bicycle stand as in claim 1 wherein at least one end of the prop member is adapted for operative connection to a tool bit.

3. A bicycle stand as in claim 1 wherein the prop member includes at least one magnet on the prop member for magnetically attaching the prop member to the bicycle.

4. A bicycle stand as in claim 1 wherein the bicycle stand includes retention means on the prop member or prop receiving means for securing the prop member to the prop receiving means, the retention means selected from any one of or a combination of a magnet or a friction retention system.

5. A bicycle stand as in claim 1 wherein the prop receiving means is adapted for operative attachment to the pedal through the dust cap threads.

6. A bicycle stand as in claim 1 wherein the prop member includes a wrench head adapted for engagement with the flats of the pedal spindle adjacent the crank arm.

7. A bicycle stand as in claim 1 wherein the bore is adapted to prevent rotational movement of the removable prop member with respect to the bore.

\* \* \* \* \*